United States Patent
Oono et al.

(10) Patent No.: US 6,270,331 B1
(45) Date of Patent: Aug. 7, 2001

(54) APPARATUS FOR FORMING PATTERN ONTO ARTICLE DURING INJECTION MOLDING

(75) Inventors: Shinpei Oono; Kazushi Miyazawa; Keiji Hanamoto; Takashi Tarutani; Takashi Matano; Kazuhisa Kobayashi; Hiroyuki Atake, all of Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/263,817

(22) Filed: Mar. 8, 1999

Related U.S. Application Data

(62) Division of application No. 08/429,218, filed on Apr. 25, 1995, now Pat. No. 5,925,302.

(30) Foreign Application Priority Data

Apr. 25, 1994 (JP) ...................................................... 6-86870

(51) Int. Cl.[7] .............................. B29C 45/16; B29C 53/18
(52) U.S. Cl. ...................... 425/112; 425/126.1; 425/297; 425/388
(58) Field of Search ............................ 9/112, 126.1, 247, 9/388, 405.1, DIG. 48; 264/163, 259, 267, 297.2, 511, 544

(56) References Cited

U.S. PATENT DOCUMENTS

| | | | |
|---|---|---|---|
| 3,743,458 | 7/1973 | Hallauer et al. | 425/122 |
| 4,319,952 | * 3/1982 | Schjeldahl | 156/510 |
| 4,545,752 | 10/1985 | Hanamoto et al. | 264/511 |
| 4,639,341 | 1/1987 | Hanamoto et al. | 264/511 |
| 4,702,877 | 10/1987 | Davis, Jr. | 264/511 |
| 4,994,224 | 2/1991 | Itoh et al. | 264/247 |
| 5,096,652 | 3/1992 | Uchiyama et al. | 264/511 |
| 5,232,653 | 8/1993 | Addeo et al. | 264/511 |
| 5,415,536 | 5/1995 | Ohno | 425/121 |
| 6,045,738 | * 4/2000 | Atake | 264/266 |

FOREIGN PATENT DOCUMENTS

| | | |
|---|---|---|
| 0251546 | 1/1988 | (EP) . |
| 0551526 | 7/1993 | (EP) . |
| 0029436 | 2/1982 | (JP) . |
| 7070610 | 5/1982 | (JP) . |
| 0132529 | 8/1983 | (JP) . |
| 3149122 | 6/1988 | (JP) . |
| 4070322 | 3/1992 | (JP) . |
| 4345815 | 12/1992 | (JP) . |
| 5-301250 | * 11/1993 | (JP) . |

* cited by examiner

Primary Examiner—Robert Davis
Assistant Examiner—Donald Heckenberg
(74) Attorney, Agent, or Firm—Parkhurst & Wendel, L.L.P

(57) ABSTRACT

In the method, after the pattern-bearing film is fed to the female mold, the distal end of the film is fixed under a lower portion of the female mold, and at the same time the film is retreated by a force from the film supply portion. Thus, this tightens up the film so that the slacks or wrinkles cannot be formed on the film. Therefore, the film can be fortunately spread around the parting surface of the female mold. In the apparatus, the film suppressing frame is pressed to the female mold through the sliding rod arranged in the female mold, in such a manner that the female mold embraces the frame. Thus, the pressing of the frame is performed by a simple structure, and the film is accurately positioned to the internal surface of the female mold. Also, the film suppressing frame is constituted to advance from and retreat to the female mold. Thus, this causes a space between the both molds and an outside standby position to be useless. A space around the apparatus can be effectively utilized.

4 Claims, 23 Drawing Sheets

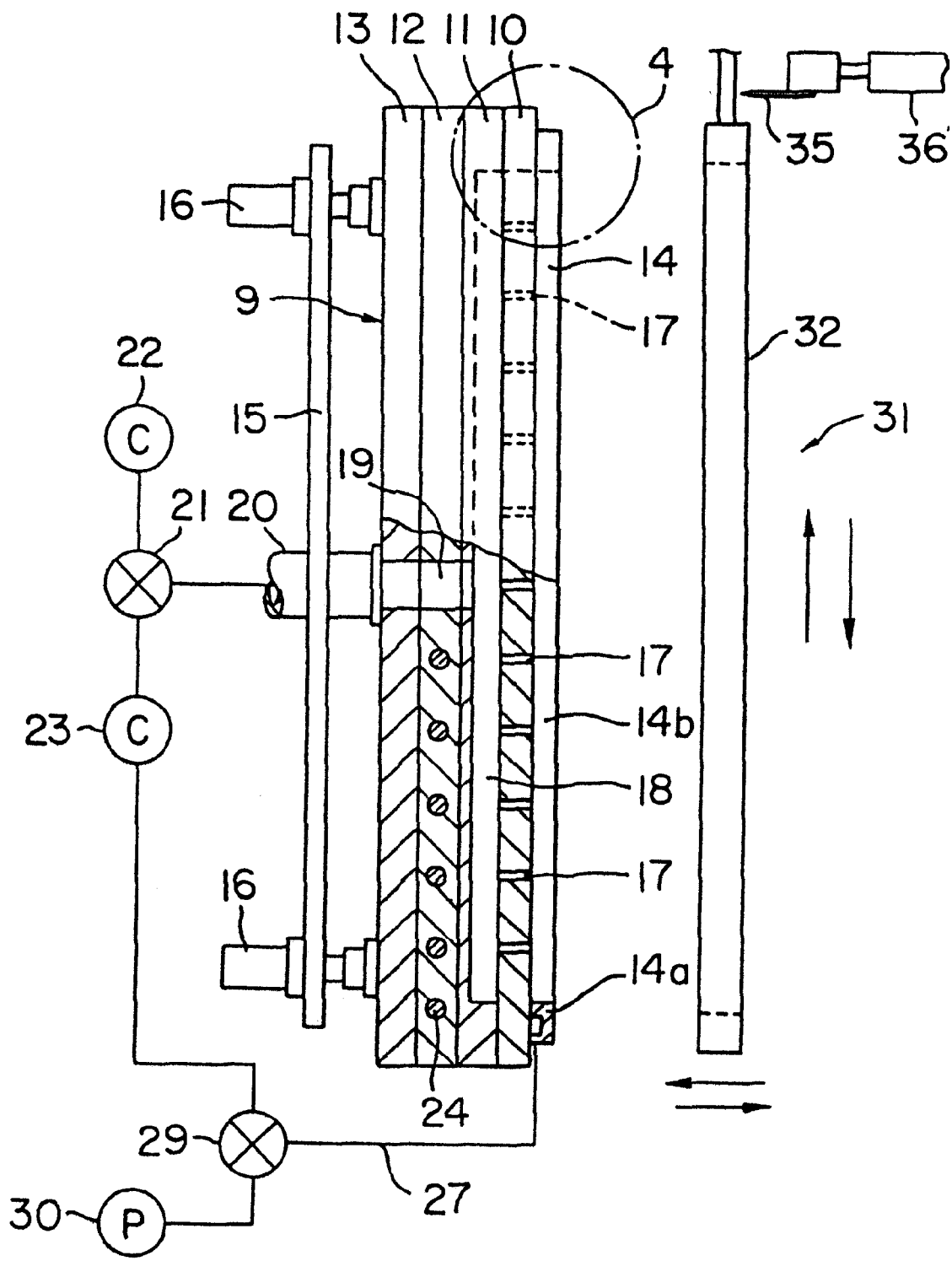
F I G. 2

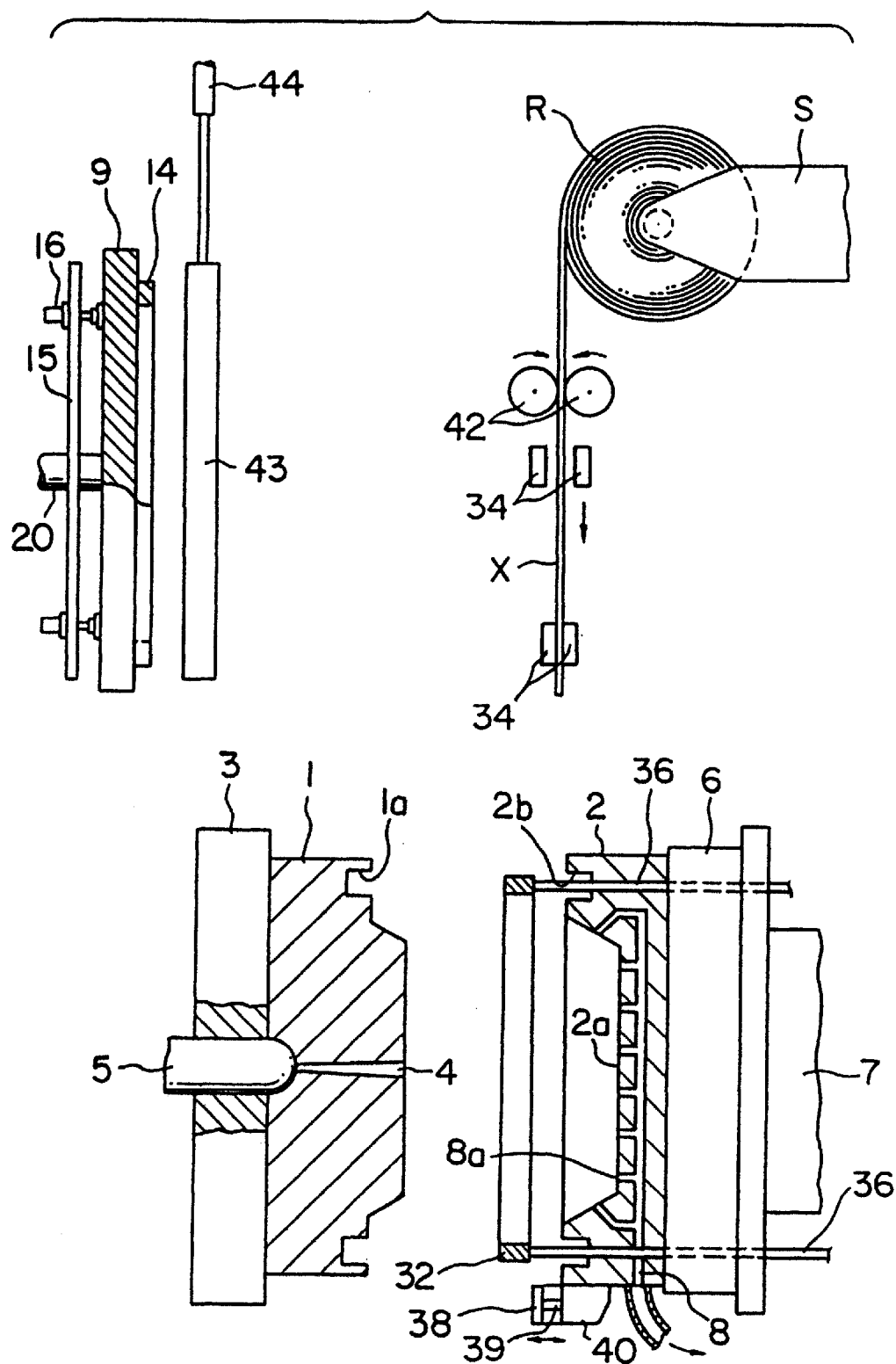
F I G. 15

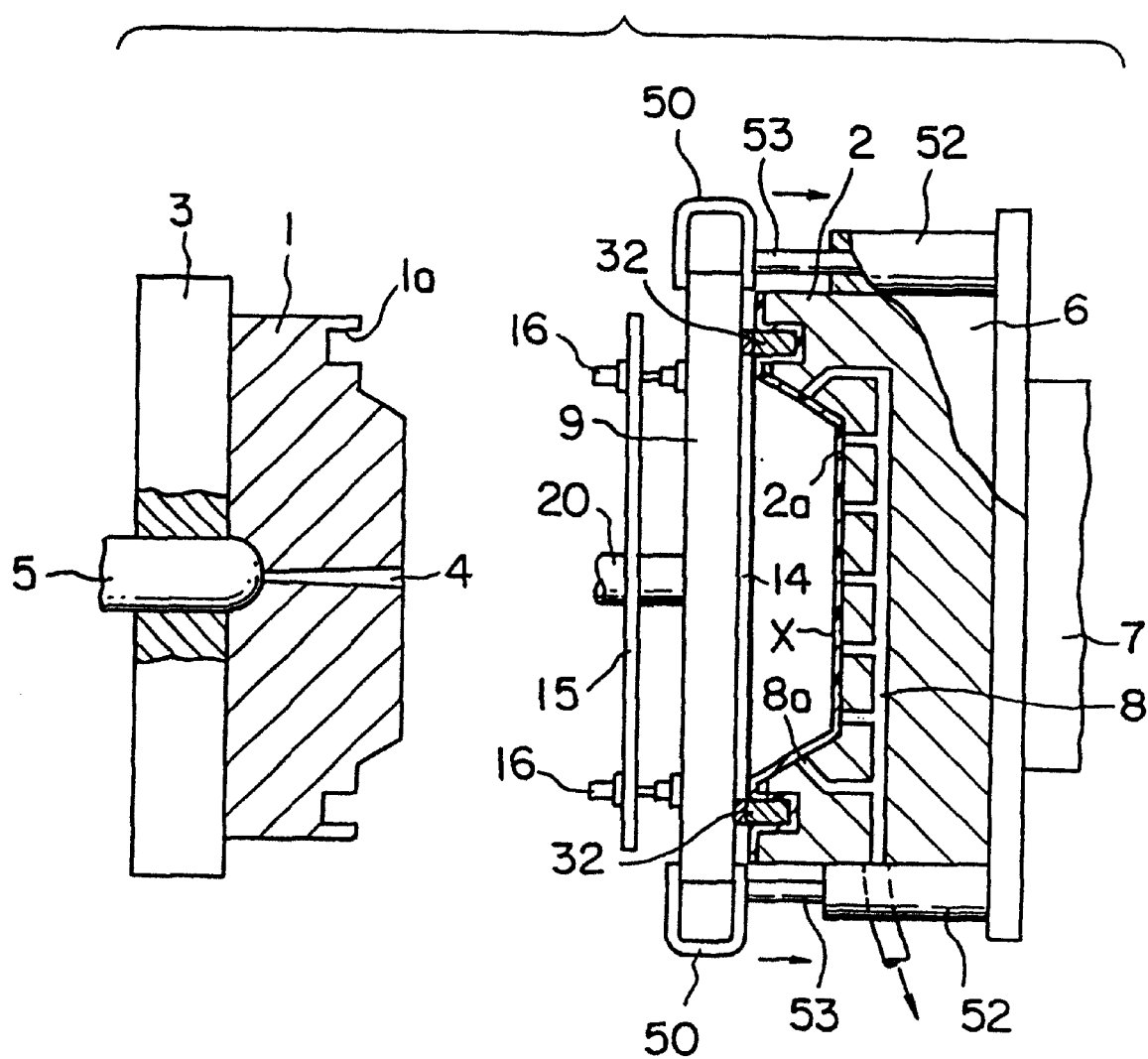
F I G. 21

APPARATUS FOR FORMING PATTERN ONTO ARTICLE DURING INJECTION MOLDING

This is a Division of application Ser. No. 08/429,218, filed Apr. 25, 1995, now U.S. Pat. No. 5,925,302.

BACKGROUND OF THE INVENTION

1. Field of the Invention

The present invention relates to a method for forming a pattern onto an article during an injection molding thereof and an apparatus for the same, for preventing impressions of a heating board from remaining on the surface of the molded article or molding.

2. Description of the Related Art

Conventionally, as decorative patterning methods for three-dimensional solid moldings, a laminate method and a transfer printing method are known. In the laminate method, after a film on which a pattern has been printed is shaped or concurrently therewith, the film is adhered to a substrate, or while or after the film is shaped, the film is filled with a resin. On the other hand, in the transfer printing method, only a pattern ink of a film on which the pattern has been printed is transferred to a molded article or molding.

As a transfer printing method, a method disclosed in Japanese Patent Laid-Open Publication Serial No. SHO 62-196113, published on Aug. 29, 1987 is known. In this method, as will be described later, a heating board which sucks a pattern-bearing film thereon is moved into a space between a male mold and a female mold which are spaced apart from each other by a predetermined distance. Then the pattern-bearing film heated by the heating board is vacuum sucked to the inner surface of the female mold. Thereafter, the heating board is retreated to the outside of the space between the male mold and the female mold. Next, the male mold and the female mold are clamped or closed. In the cavity defined by these molds, a molten resin is injected to form a molded article. Thus, the pattern-bearing film is attached to the surface of the molded resin article.

In this method, however, when the pattern-bearing film is sucked to the heating board, air is caught between the heating board and the pattern-bearing film. This air remains as air bubbles so that the pattern-bearing film is not uniformly heated. In addition, marks or impressions of vacuum holes defined on the heating board remain on the surface of the final molding having the pattern-bearing film sucked thereby. Thus, the appearance of the molding is adversely affected.

To solve this problem, a method as disclosed in Japanese Patent Laid-Open Publication Serial No. HEI 5-301250 (i.e., Japanese Patent Application Serial No. HEI 4-108271) has been proposed. In this method, a square-shaped holding flame is protruded from a peripheral edge of the heating surface of the heating board so as to contact with the pattern-bearing film, and a concave portion is formed at the inside of the annular holding frame. When the pattern-bearing film is located to be opposed to the heat board in order to heating the film, the concave portion prevents the film from direct contact with the heating surface of the heating board. Thus, the concave portion restrains the marks or impressions of vacuum holes from being formed on the surface of the final molding so that the appearance of the molding is fortunately affected.

In the above method, however, while the pattern-bearing film is heated by the heating board so as to be softened, the film is transferred into the internal surface of the female mold so as to be positioned thereto. At this state, slacks or wrinkles are liable to be formed on the film and the positioning of the film cannot be accurately performed by the effect of the softened film.

SUMMARY OF THE INVENTION

The present invention is made from the above-mentioned point of view. A first object of the present invention is to provide a method for forming a pattern onto an article during an injection molding thereof and an apparatus for the same, in which the pattern-bearing film can be transferred to a position opposed to the internal surface of the female mold under the condition that the slacks or wrinkles are not formed on the film, so that the pattern-bearing film can be accurately positioned to the internal surface of the female mold.

A second object of the present invention is to provide an apparatus for forming a pattern onto an article during an injection molding thereof and an apparatus for the same, in which the heating board can be simply and securely pressed into the female mold.

A third object of the present invention is to provide an apparatus for forming a pattern onto an article during an injection molding thereof and an apparatus for the same, in which the heating board can be securely pressed into the parting surface of the female mold.

A fourth object of the present invention is to provide an apparatus for forming a pattern onto an article during an injection molding thereof and an apparatus for the same, in which the heating board can uniformly heat the entire pattern-bearing film.

A fifth object of the present invention is to provide an apparatus for forming a pattern onto an article during an injection molding thereof and an apparatus for the same, in which a insulation board waiting at a standby position an prevent the pattern-bearing film or the like from being heated and deformed in the standby position.

A sixth object of the present invention is to provide an apparatus for forming a pattern onto an article during an injection molding thereof and an apparatus for the same, in which the pattern-bearing film can be cut by a simple structure and the cutting is lower in cost.

According to one aspect of the present invention, the first object is accomplished by a method for forming a pattern onto an article during an injection molding thereof, comprising the steps of: feeding a pattern-bearing film to a molding position where a male mold and a female mold are opposed; heating said pattern-bering film by a heating board so as to soften it, said heating board having a heating surface and being movable into and away from a space between said male mold and said female mold; transferring said pattern-bearing film to an internal surface of said female mold so as to contact said pattern-bearing film with said internal surface; causing said male mold and said female mold with said pattern-bearing film therein to approach each other to form a closed molding cavity; and injecting a molten resin into said cavity to form a molded article to adhere said pattern-bearing film to the surface of said article, wherein the improvement comprises the step of: feeding the pattern-bearing film from a film supplying section to a position which is opposed to the internal surface of the female mold; fixing a distal end of the pattern-bearing film by a film fixing frame arranged at a downstream-side of the female mold along the film feeding direction; retreating the pattern-bearing film to the film supplying section so as to tighten up the pattern-bearing film; and fixing the pattern-bearing film on the parting surface of the female mold, whereby the heating board is moved into a position where the heating surface thereof is opposed to the pattern-bearing film fixed on the parting surface, and then the pattern-bearing film is softened by the heating surface of the heating board means.

In the method, after the pattern-bearing film is fed to the female mold, the distal end of the film is fixed under a lower portion of the female mold, and at the same time the film is retreated by a tensile force from the film supply portion. Thus, this tightens up the film so that the slacks or wrinkles cannot be formed on the film. Therefore, the film can be fortunately spread around the parting surface of the female mold.

According to another aspect of the present invention, the second object is accomplished by an apparatus for forming a pattern onto an article during an injection molding thereof, comprising: means for feeding a pattern-bearing film to a molding position where a male mold and a female mold are opposed; heating board means for heating said pattern-bearing film so as to soften it, said heating board means having a heating surface and being movable into and away from a space between said male mold and said female mold; means for transferring said pattern-bearing film to an internal surface of said female mold so as to contact said pattern-bearing film with said internal surface; means for causing said male mold and said female mold with said pattern-bearing film therein to approach each other to form a closed molding cavity; and resin injecting means for injecting a molten resin into said cavity to form a molded article to adhere said pattern-bearing film to the surface of said article, wherein the improvement comprises: a film suppressing frame for fixing said peripheral portion of said pattern-bearing film which has fed by said feed means; fitting groove means, defined on the periphery of a parting surface of said female mold, for holding the film suppressing frame; and a sliding rod, slidably supported within a through-hole formed in the female mold and extended through the parting surface thereof, for moving the film suppressing frame so that the film suppressing frame is-pressed into the fitting groove means with the pattern-bearing film interposed therebetween, whereby the heating board is moved into a position where the heating surface thereof is opposed to the pattern-bearing film fixed on the parting surface, and then the pattern-bearing film is softened by the heating surface of the heating board means.

In the apparatus, the film suppressing frame is pressed to the female mold through the sliding rod arranged in the female mold, in such a manner that the female mold embraces the frame. Thus, the pressing of the frame is performed by a simple structure, and the film is accurately positioned to the internal surface of the female mold. Also, the film suppressing frame is constituted to advance from and retreat to the female mold. Thus, this causes a space between the both molds and an outside standby position to be useless. A space around the apparatus can be effectively utilized.

According to the other aspect of the present invention, the third object is accomplished by an apparatus for forming a pattern onto an article during an injection molding thereof, wherein the improvement comprises: a pair of holding members, arranged on both sides of the female mold, for holding the heating board means so as to be opposed to the parting surface of the female mold, the holding members being movable along a direction connecting the male and female molds so as to press the heating board means to the female mold.

In the apparatus, the heating board is held or surrounded by the holding members provided on the female mold, in such a manner that the female mold embraces the heating board Thus, the heating board is intensely. pressed to the female mold. Even if the compressed air is blown from the heating board at the vacuum formation, the holding members prevent the heating board from being apart from or removed from the female mold. The driving device can be miniaturized, as compared that the heating board is pressed into the female mold by means of a driving device disposed extremely apart from the molds.

According to the other aspect of the present invention, the fourth object is accomplished by an apparatus for forming a pattern onto an article during an injection molding thereof, the improvement wherein said heating board means is divided into a plurality of blocks, and each block independently controlling the amount of the heat generated by the block.

In the apparatus, each block independently controlling the amount of the heat generated by the block. Thus, the temperature distribution can be uniform.

According to the other aspect of the present invention, the fifth object is accomplished by an apparatus for forming a pattern onto an article during an injection molding thereof, wherein the improvement comprises: insulation board means for covering the entire heating surface of the heating board means when the heating board means is waiting at a standby position defined apart from the space between the male and female molds.

In the apparatus, the insulation board prevents the heat radiated from the heating board from excessively heating the pattern-bearing film before forming, the forming apparatus and so forth, whereupon this restrains melting, deformation, fire and so forth of the pattern-bearing film.

According to the other aspect of the present invention, the sixth object is accomplished by an apparatus for forming a pattern onto an article during an injection molding thereof, wherein the improvement comprises: heating wire means, arranged at the upstream-side of the female mold along the film feeding direction, for heating the pattern-bearing film so as to cut it into a proceeding portion and a following portion thereof when the heating board means is pressed into the parting surface of the female mold.

In the apparatus, when the heating board is pressed into the parting surface of the female mold, the pattern-bearing film is automatically cut by the heating wire. In addition, it is simple in structure and is lower in cost.

Also, the pattern-bearing film opposed to the parting surface of the female mold may be heated by the heating board in a non-contact state. Alternatively, the pattern-bearing film opposed to the parting surface of the female mold may be heated by the heating board in a contact state.

These and other objects, features and advantages of the present invention will become more apparent in light of the following detailed description of best mode embodiments thereof, as illustrated in the accompanying drawings.

BRIEF DESCRIPTION OF THE DRAWINGS

FIG. 2 is a partial cross-sectional view of the heating board shown in FIG. 1;

FIG. 15 is a side view schematically showing the overall construction of an apparatus for forming a pattern onto an article during an injection molding thereof according to a second embodiment of the present invention;

FIG. 21 is an explanation view a step of the operation different from the step shown in FIG. 20;

DETAILED DESCRIPTION OF THE PREFERRED EMBODIMENTS

Figure 1:
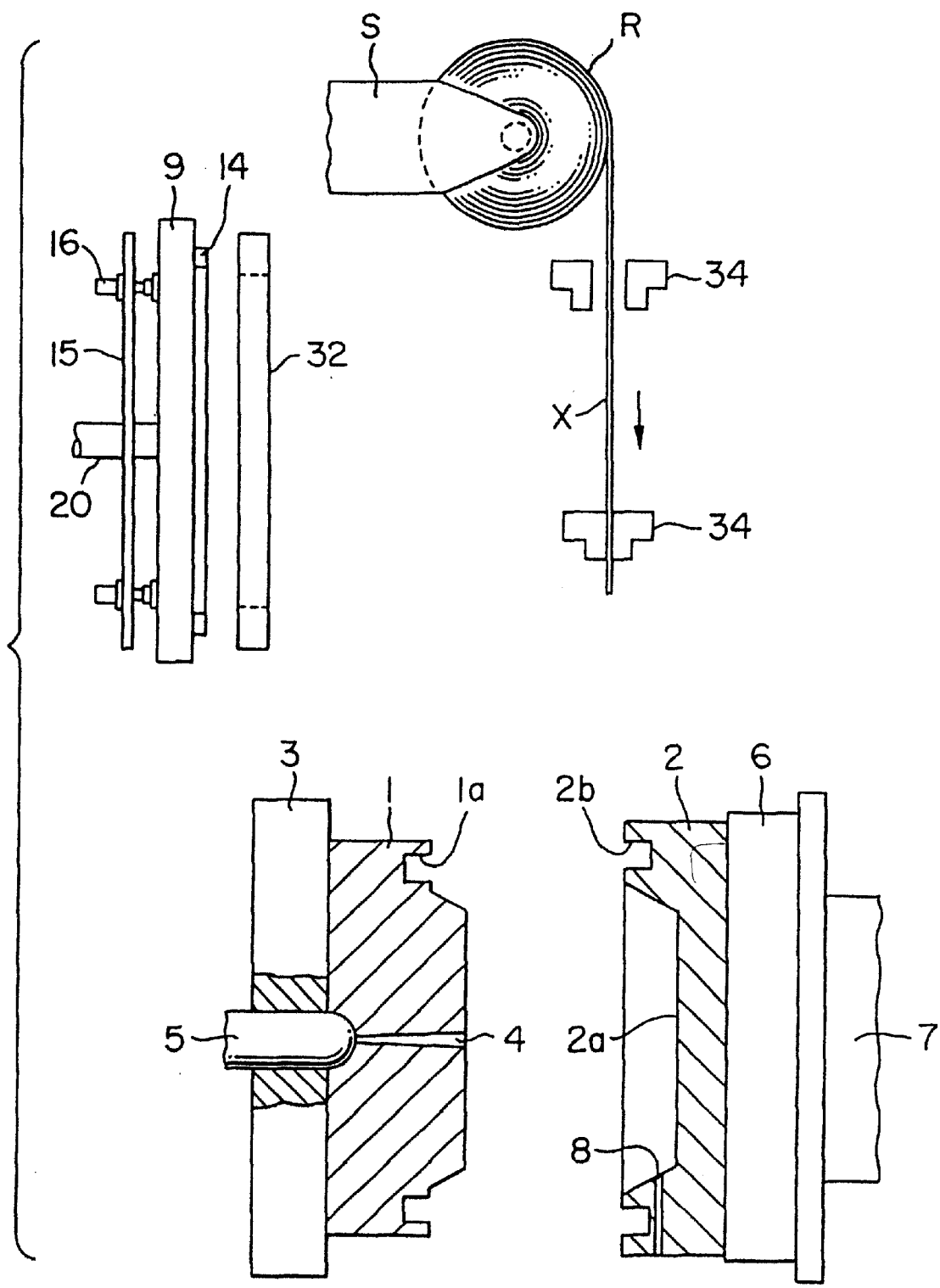
FIG. 1 is a side view schematically showing the overall construction of an apparatus for forming a pattern onto an article during an injection molding thereof according to a first embodiment of the present invention.

FIG. 1 is a side view schematically showing the overall construction of an apparatus for forming a pattern onto an article during an injection molding thereof. A male mold 1 is fixed on a mounting board 3. The male mold 1 is opposed to a female mold 2. An injection nozzle 5 is arranged on the male mold 1 to communicate with an injection gate 4. The female mold 2 is fixed to a ram 7 through a movable board 6. With forward and backward traveling operation of the ram 7, the female mold 2 advances to and retreats from the male mold 1. In addition, the female mold 2 is provided with an air exhaust hole 8 through which air in the female mold 2 is exhausted to the outside by a vacuum pump (not shown in the figure). A fitting groove 1a in a shape of a rectangle is formed on a parting surface of the male mold 1, and another fitting groove 2b in a shape of a rectangle is formed on a parting surface of the female mold 2 so as to be opposed to the fitting groove 1a.

At a position spaced apart from the outer peripheries of the male mold 1 and the female mold 2 by a predetermined distance, a heating board 9 is disposed. The position where the heating board 9 is disposed will hereinafter be referred to as the standby position. On the other hand, the position where the male mold 1 and the female mold 2 are opposed and the heating board 9 is moved therebetween will hereinafter be referred t6 as the loading position. The heating board 9 can be laterally travelled between the standby position and the loading position by a drive means (not shown in the figure).

A pattern-bearing film X is drawn from a roll R in a direction of an arrow shown in FIG. 1 by means of chuck devices 34 and 34 so that the film X is fed to a position opposed to the female mold 2, as described later.

Figure 3:
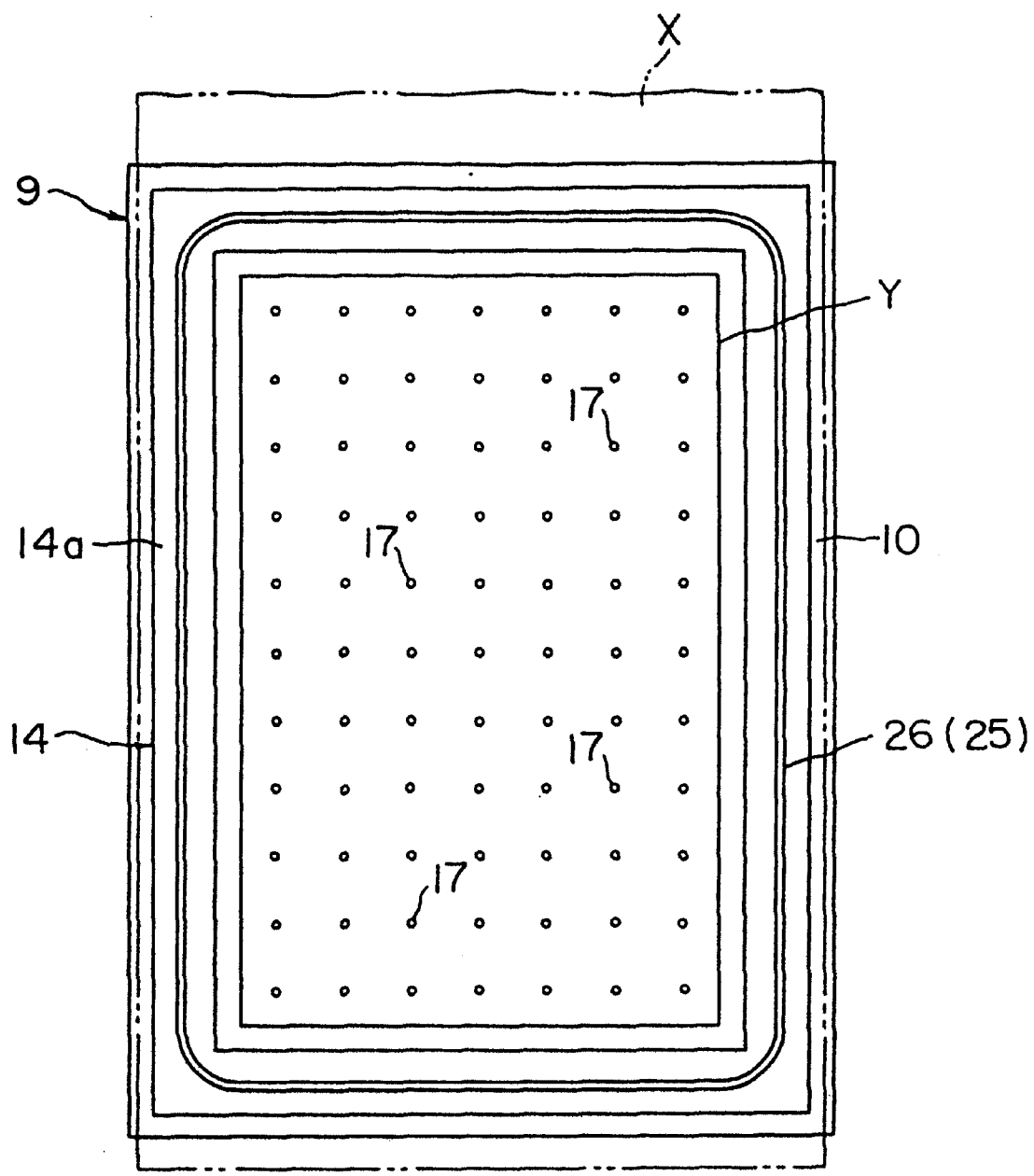
FIG. 3 is a front view of the heating board shown in FIG. 1.

FIGS. 2 and 3 show the construction of the heating board 9 in detail.

The heating board 9 has a stacked structure of a heating plate 10, a liner plate 11, a heater panel 12, and an insulation plate 13 which are stacked in this order. As described later, the heating plate 10 heats the pattern-bearing film X. A holding frame 14 in a shape of a rectangle is provided on the front surface of the heating plate 10. The heating board 9 is mounted to a support member 15 so as to be moved by solenoids 16. With the operation of the solenoids 16, the heating board 9 is moved in the direction perpendicular to the pattern-bearing film X. The solenoids 16 cause the heating board 9 to advance to and retreat from the female mold 2.

Figure 5:
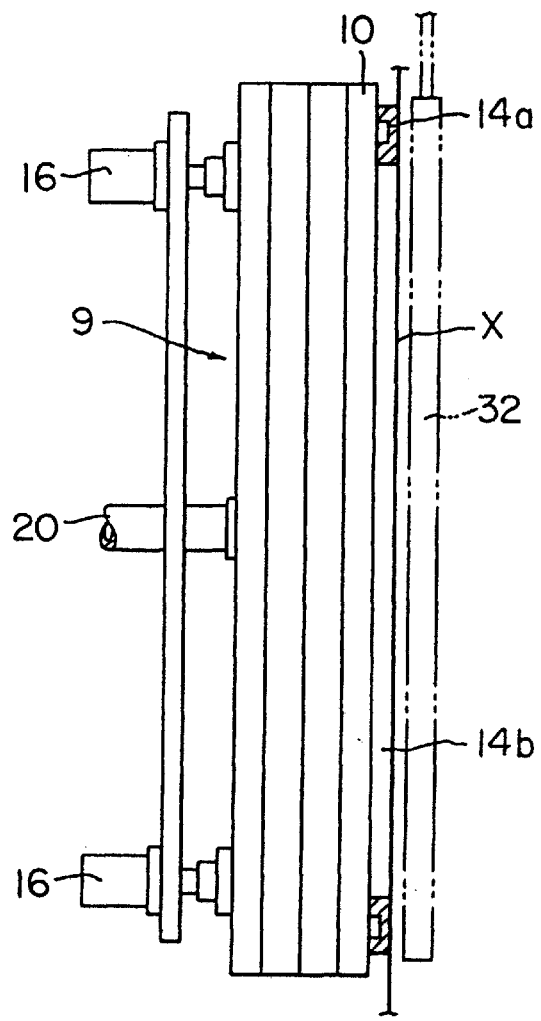
FIG. 5 is a side view showing the heating board and the film suppressing frame.

The heating plate 10 of the board 9 is made of a metal with high heat transfer characteristic. In the area where the heating plate 10 is surrounded by a peripheral wall 14a of the holding frame 14, a large number of small air blowing holes 17 are formed in an array at intervals of a predetermined pitch. The air blowing holes 17 pass from the front to rear surfaces of the heating plate 10. With the heating plate 10 and the peripheral wall 14a of the holding frame 14, a recess 14b is formed as also shown in FIG. 5. When a ceramic layer is formed on the front surface of the heating plate 10, radiant heat efficiency will be improved. The liner plate 11, which is disposed behind the heating plate 10, is composed of a metal plate with a high heat transfer characteristic. The liner plate 11 has a surface which is in contact with the rear surface of the heating plate 10. The surface has grooves 18 distributed therein through which compressed air is supplied to the air blowing holes 17. An air passageway 19 is provided at the center of the liner plate 11. The air passageway 19 passes through the liner plate 11. The air passageway 19 also passes through the center of the heater panel 12 and the insulation plate 13. The air passageway 19 is open at the rear surface of the insulation plate 13. The open portion of the air passageway 19 is connected to an air hose 20. The air hose 20 can be connected to either a low pressure compressor 22 or a high pressure compressor 23 by a three-way switching valve 21.

The heater panel 12 has a number of heater wires 24. The heater wires 24 are connected to a lead cable (not shown in the figure) which supplies electricity. The insulation plate 13 serves to effectively transfer the heat generated by the heater wires 24 toward the heating plate 10.

Figure 4:
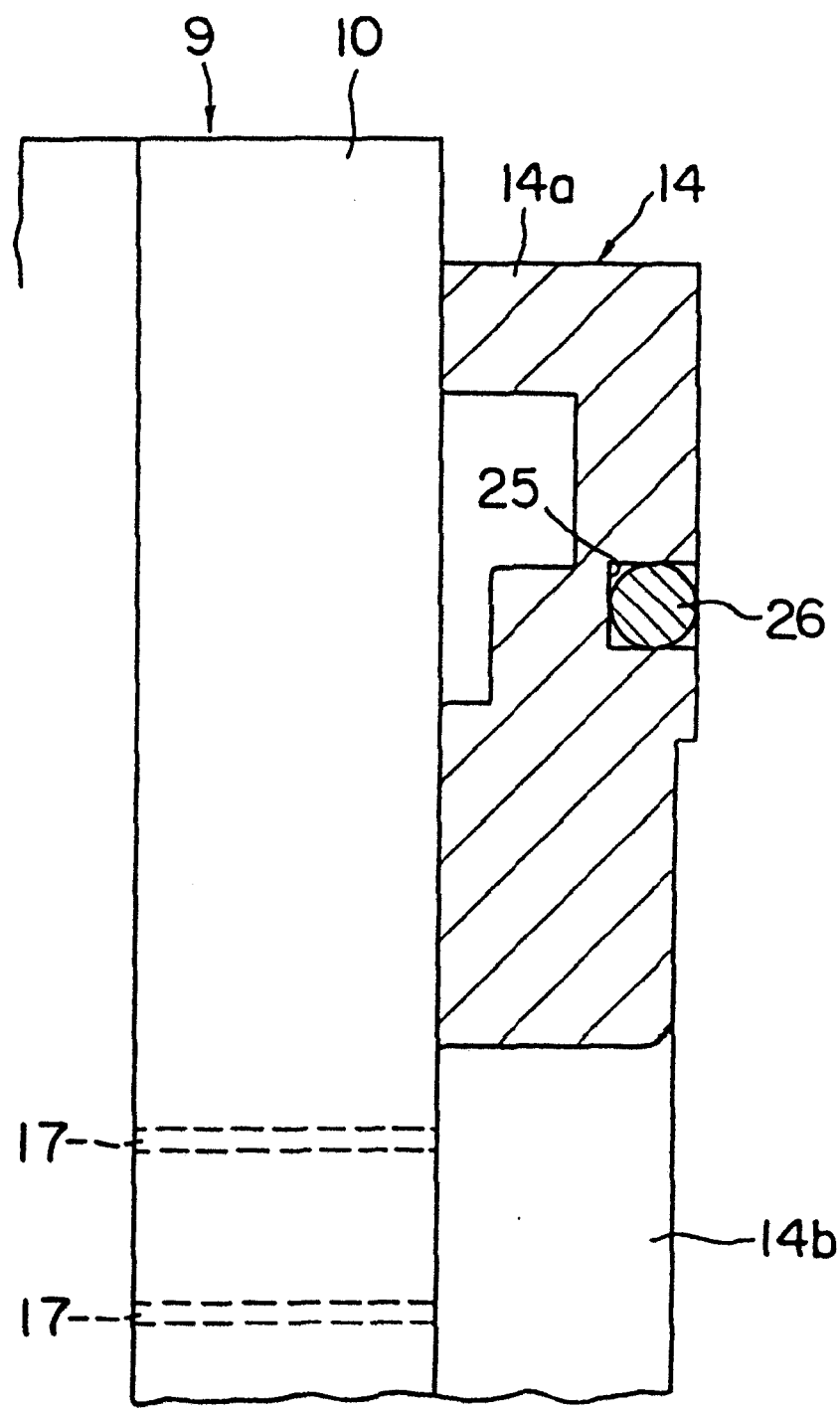
FIG. 4 is a enlarged cross-sectional view showing the heating board and the holding frame.
Figure 6:
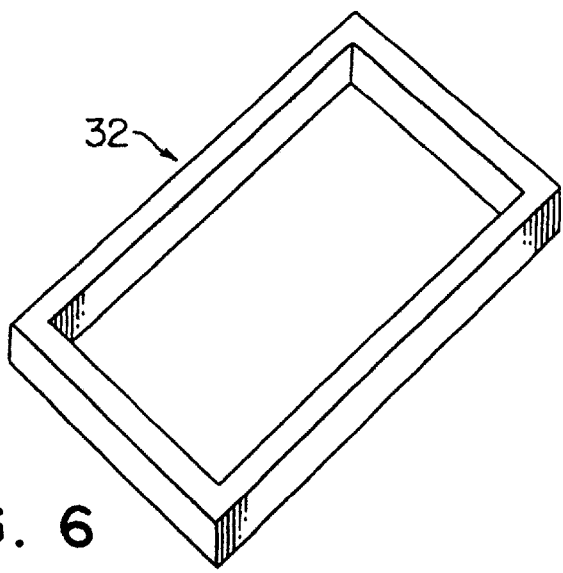
FIG. 6 is a perspective view showing the film suppressing frame.

As shown in FIG. 3 and FIG. 4 (which is an enlarged view of the portion denoted by symbol IV in FIG. 2), a seal ring receiving groove 25 is formed along the peripheral wall 14a of the holding frame 14. A seal ring 26 is fitted in the groove 25. With the seal ring 26, air leakage can be prevented. In addition, in the vacuum molding operation, the pattern-bearing film X can be prevented from being deviated from a predetermined position. As shown in FIGS. 1 and 2, at the standby position of the heating board 9, a film suppressing device 31 is provided in opposition thereto. The film suppressing device 31 includes a square-shaped film suppressing frame 32 (shown in FIG. 6). The suppressing frame 32 operates to suppress and hold the pattern-bearing film X in a perfectly non-contact state. The film suppressing device 31 has a chuck device 34 and a cutter device 35. The chuck device 34 pulls the pattern-bearing film X to the position between the heating board 9 and the film suppressing frame 32 while the film suppressing frame 32 is apart from the heating board 9. The cutter device 35 cuts the pulled pattern-bearing film X to have a predetermined size The cutter device 35 is driven by an air cylinder 36.

The pattern-bearing film X is initially in the form of a strip on which particular patterns Y (see FIG. 3) are printed at predetermined intervals. The pattern-bearing film X is wound in a roll (R) shape and held on a supply and holding device S.

As an example of the "laminate film" for the above-mentioned pattern-bearing film, a thermoplastic resin such as acrylic resin, acrylonitrile-butadiene-styrene copolymer (ABS), or polyvinyl chloride with a pattern printed may be used.

As an example of the above-mentioned transfer printing film, such a material may be used where a transfer printing layer composed of a transparent protection layer, a pattern layer, and an adhesive layer is formed over a releasable substrate film such as biaxial stretching polyethylene terephthalate resin or polypropylene.

From the viewpoint of the three-dimensional contour-following characteristic (molding characteristic) required in the process for injection-molding articles with simultaneous forming of patterns and from the viewpoint of durability (such as wearing resistance) of the surface of the pattern, "a resin which will become a non-tacky thermoplastic solid even in a non-crosslinked state after drying of the diluting solvent" may be used. Such resin is disclosed in Japanese Patent Laid-Open Publication Serial No. SHO 61-69487 and SHO 60-161121. An example of the film substrate material of the laminate film or the transparent protection layer of the transfer film is a substance where a non-tacky thermoplastic copolymer such as acrylic resin with a glass transition temperature of 0 to 250° C. is added with a polymerizable crosslinkable radical such as acryloyl radical or meta-acryloyl radical.

The substance in a state before polymerization or crosslinking is transferred or laminated to the surface of the injected resin molding. Thereafter, with radiation of ultraviolet rays or electric beam, the resultant laminate is crosslinked so that it is hardened.

Figure 7:
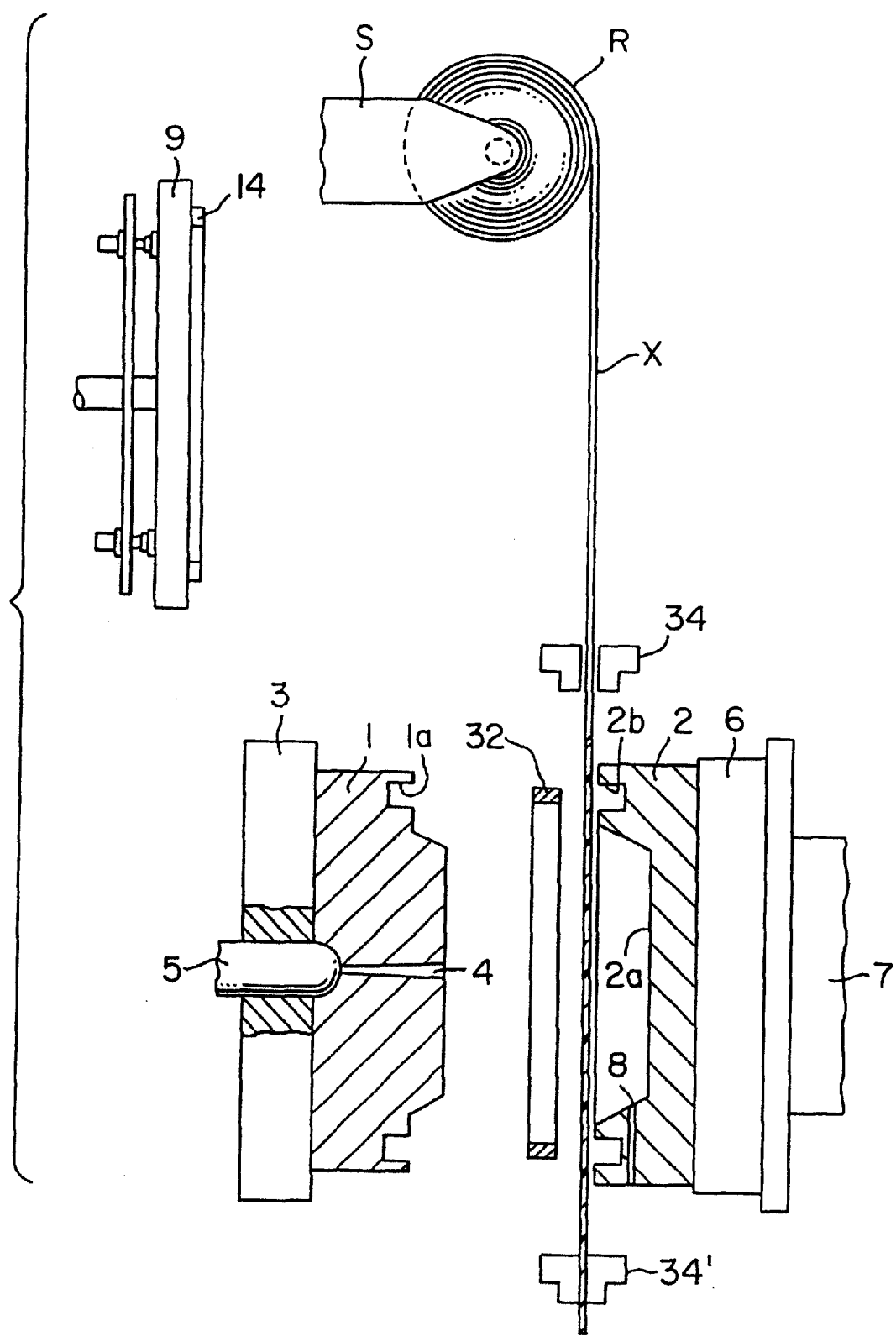
FIG. 7 is an explanation view showing a first step of the operation according to the first embodiment.

Now, with reference to FIGS. 7 to 14, an operation of the apparatus will be described. The operation starts from a state of FIG. 1, and then the chuck device 34 catches the end of the pattern-bearing film X and pulls it across the male and female molds 1 and 2 until it covers the entire cavity of the female mold 2, as shown in FIG. 7. The film suppressing frame 32 is moved from the standby position disposed outside the region of the male mold 1 and the female mold 2 to a position opposed to the female mold 2 with the pattern-bearing film X therebetween as shown in FIG. 7. Thereafter, the suppressing frame 32 is adjusted to coincide with the fitting groove 2b on the parting surface of the female 2. The groove 2b is defined so that it surrounds the cavity surface.

Figure 8:
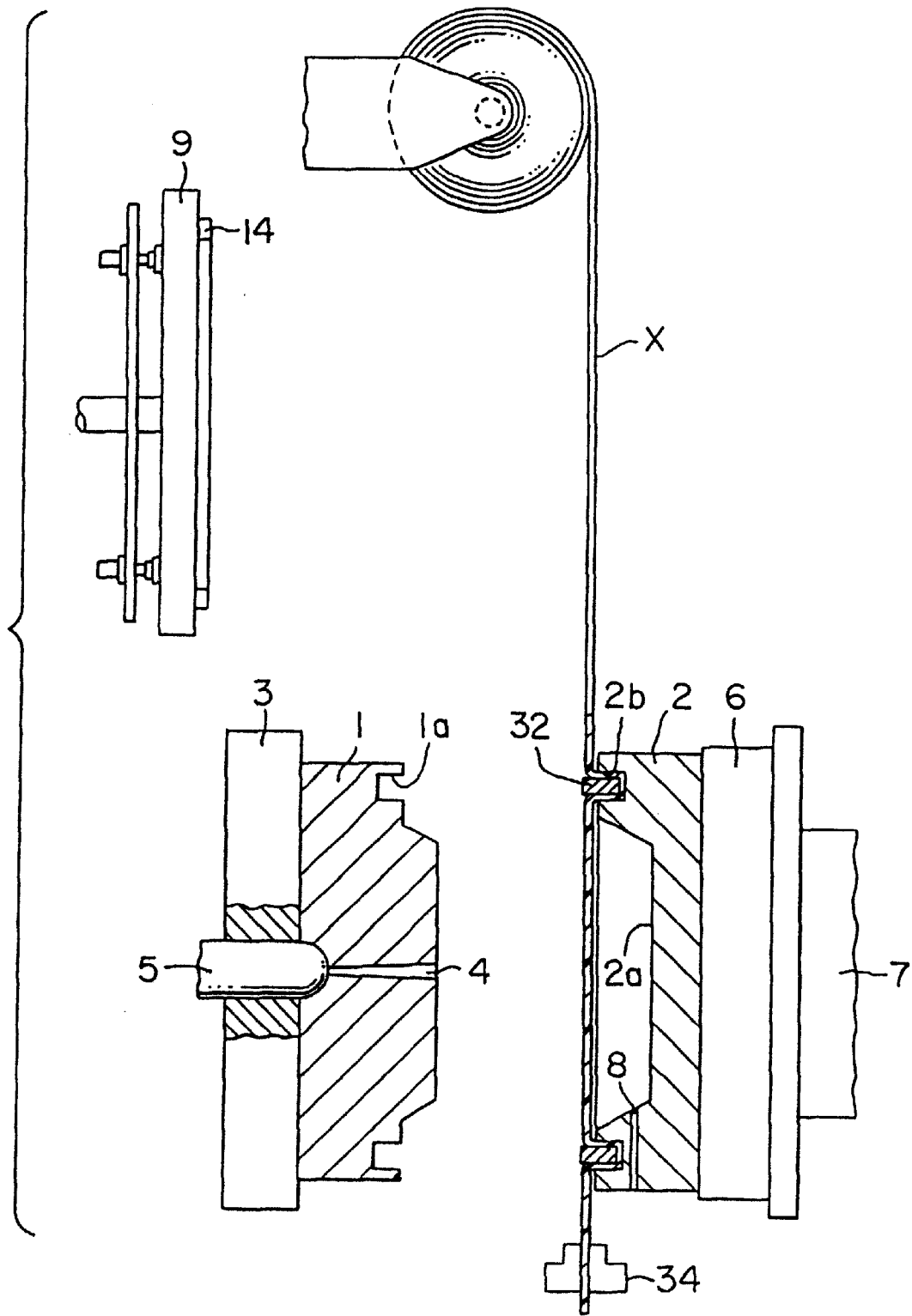
FIG. 8 is an explanation view showing a step next to the step of FIG. 7.
Figure 9:
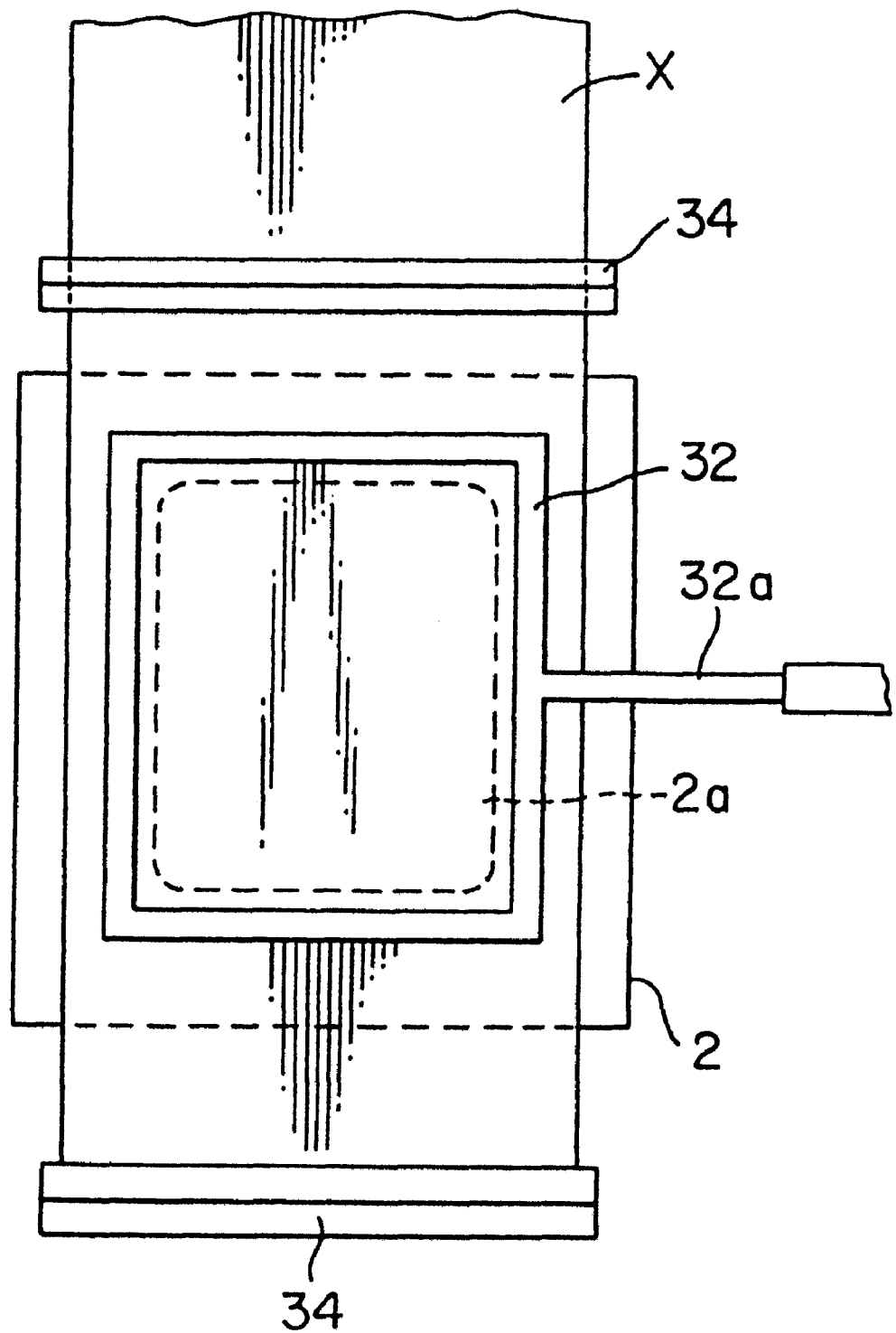
FIG. 9 is a side view of the female mold shown in FIG. 8.

Next, as shown in FIG. 8, the film suppressing frame 32 is pressed into the fitting groove 2b with the pattern-bearing film X interposed therebetween. Thus, the pattern-bearing film X is contacted to the parting surface of the female mold 2. At this point, it is preferred that the outer surface of the film suppressing frame 32 is level with the parting surface of the female mold 2 after the fitting is completed. However, as shown in the figure, when a groove 1a for fitting the film suppressing frame 32 is formed on the peripheral portion of the male mold 1 so that it is opposed to the fitting groove 2b of the female mold 2, it is not necessary to cause the outer surface of the film suppressing frame 32 to be level with the parting surface. Rather, the film suppressing frame 32 may protrude so that a peripheral portion 14a of the holding frame 14 can be easily pressed. FIG. 9 is a front view of the female mold 2 seen from the left in FIG. 8. As shown in FIG. 9, the film suppressing frame 32 has a connection portion 32 connected to a driving source disposed on the side thereof.

Figure 10:
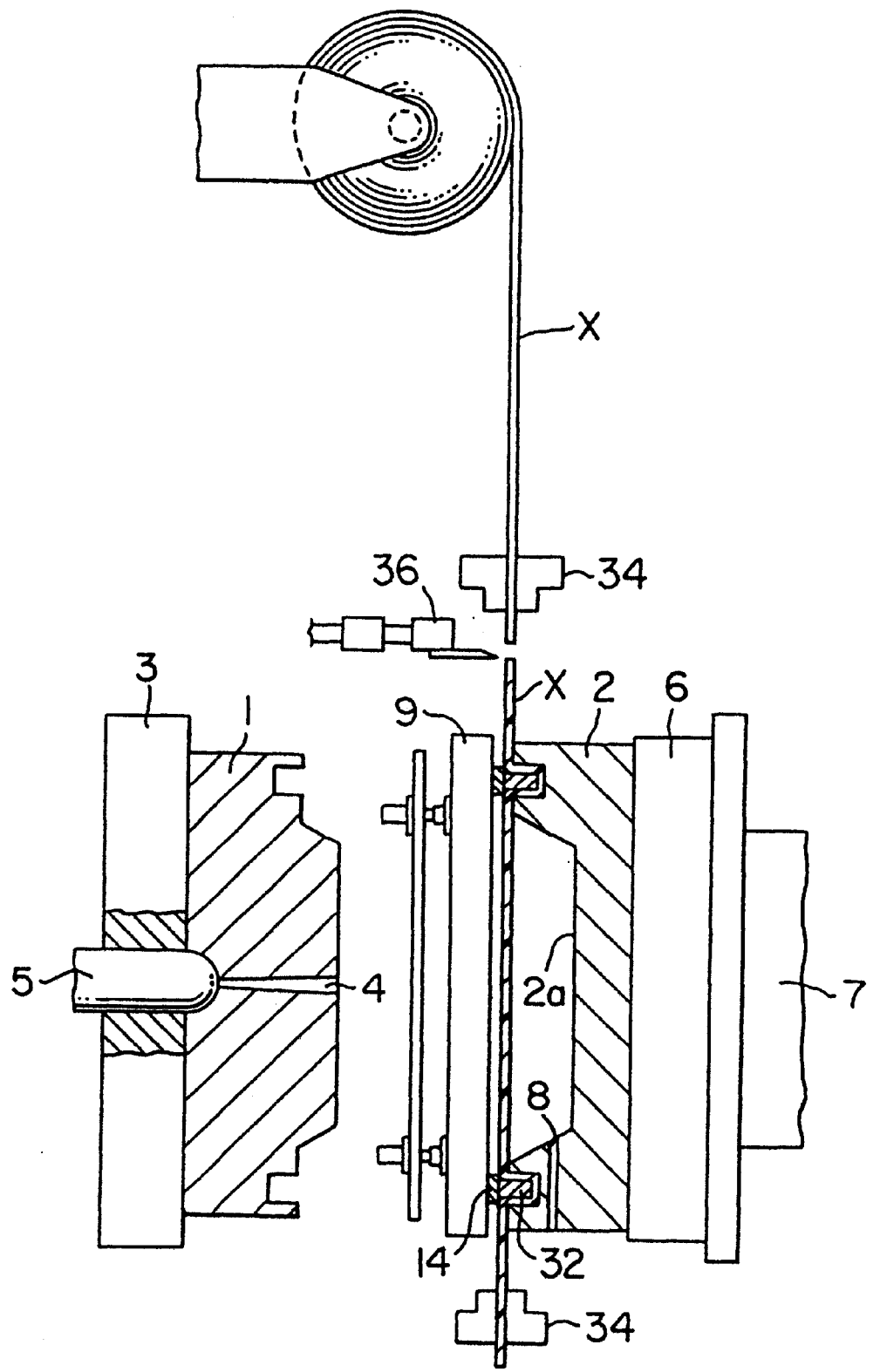
FIG. 10 is an explanation view showing a step next to the step of FIG. 8.
Figure 11:
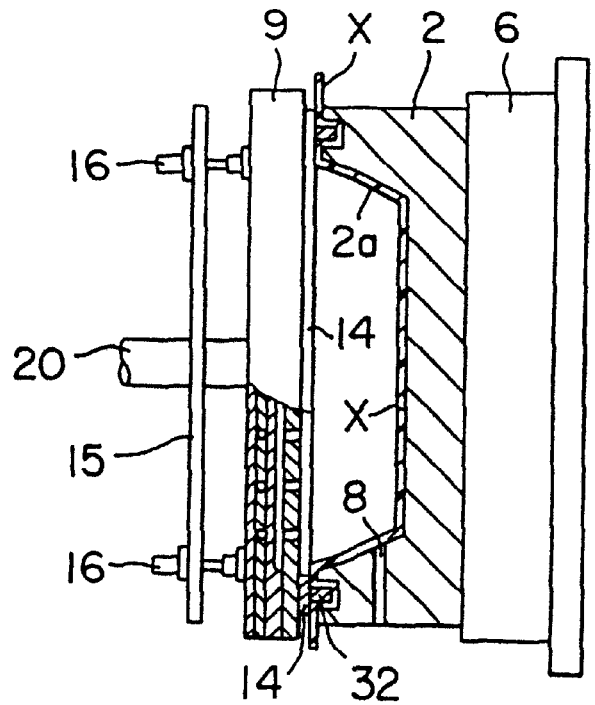
FIG. 11 is an explanation view showing a step next to the step of FIG. 10.

Next, as shown in FIG. 10, the heating board 9 at the standby position is moved to the front surface of the female mold 2. Thereafter, by the peripheral wall 14a of the holding frame 14 on the heating board 9, the pattern-bearing film X is pressed through the film suppressing frame 32. At this stage, the pattern-bearing film x is brought in contact with the peripheral wall 14a of the holding frame 14. Thus a closed heating space is defined, and the pattern-bearing film X is heated in a non-contact state. After the pattern-bearing film X is satisfactorily softened, as shown in FIG. 11, it is subjected to a vacuum suction through the air exhaust hole 8. When necessary, together with the vacuum suction, an air may be blown toward the pattern-bearing film X through the air blowing hole 17. Thus, the pattern-bearing film X is caused to accord to the contour of the cavity surface 2a.

Figure 12:
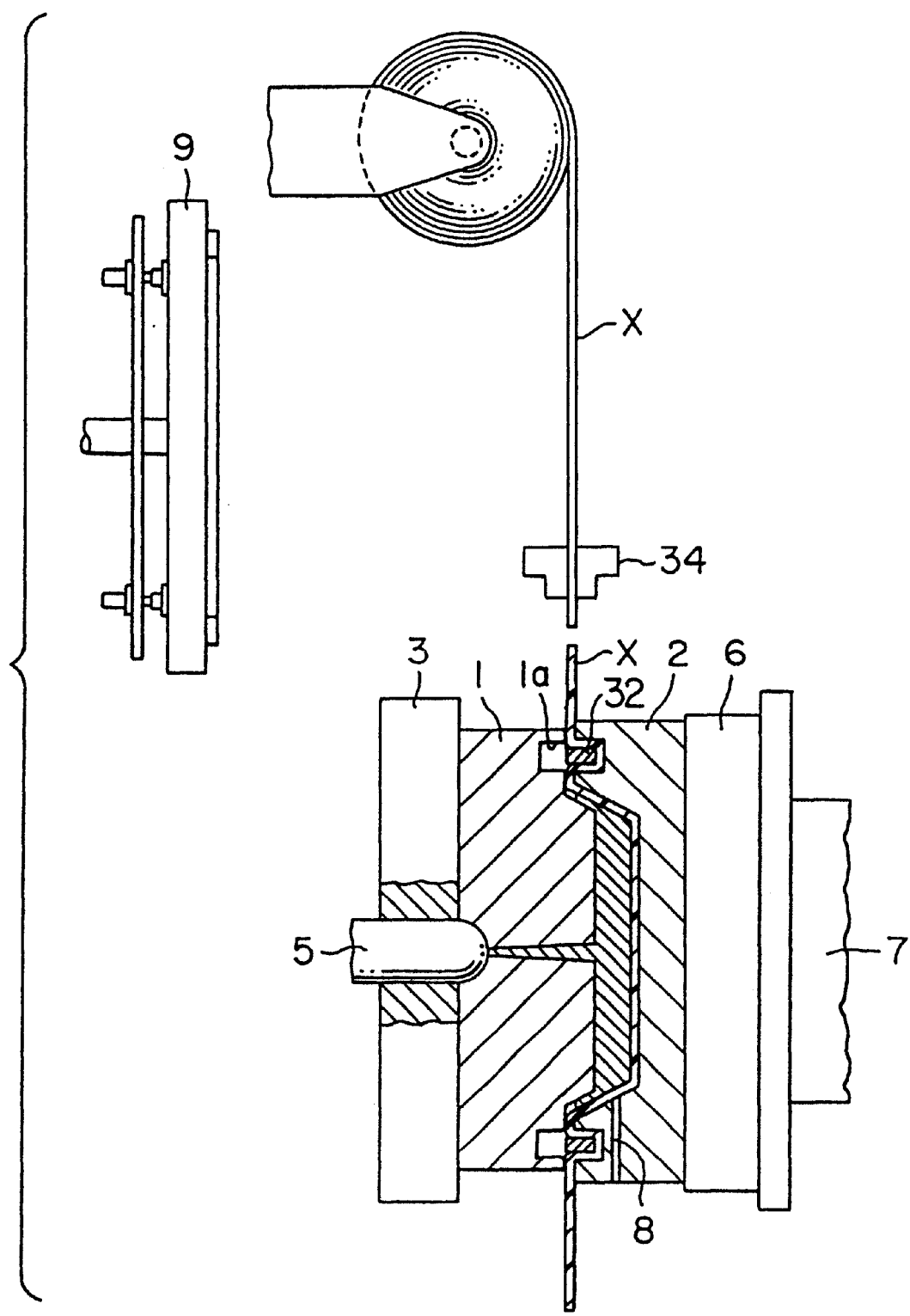
FIG. 12 is an explanation view showing a step next to the step of FIG. 11.

Thereafter, as shown in FIG. 12, the heating board 9 is retreated to the standby position. Next, the female mold 1 and the male mold 2 are clamped. A molten resin is injected from the injection gate 4 so that the cavity is filled therewith.

Figure 13:
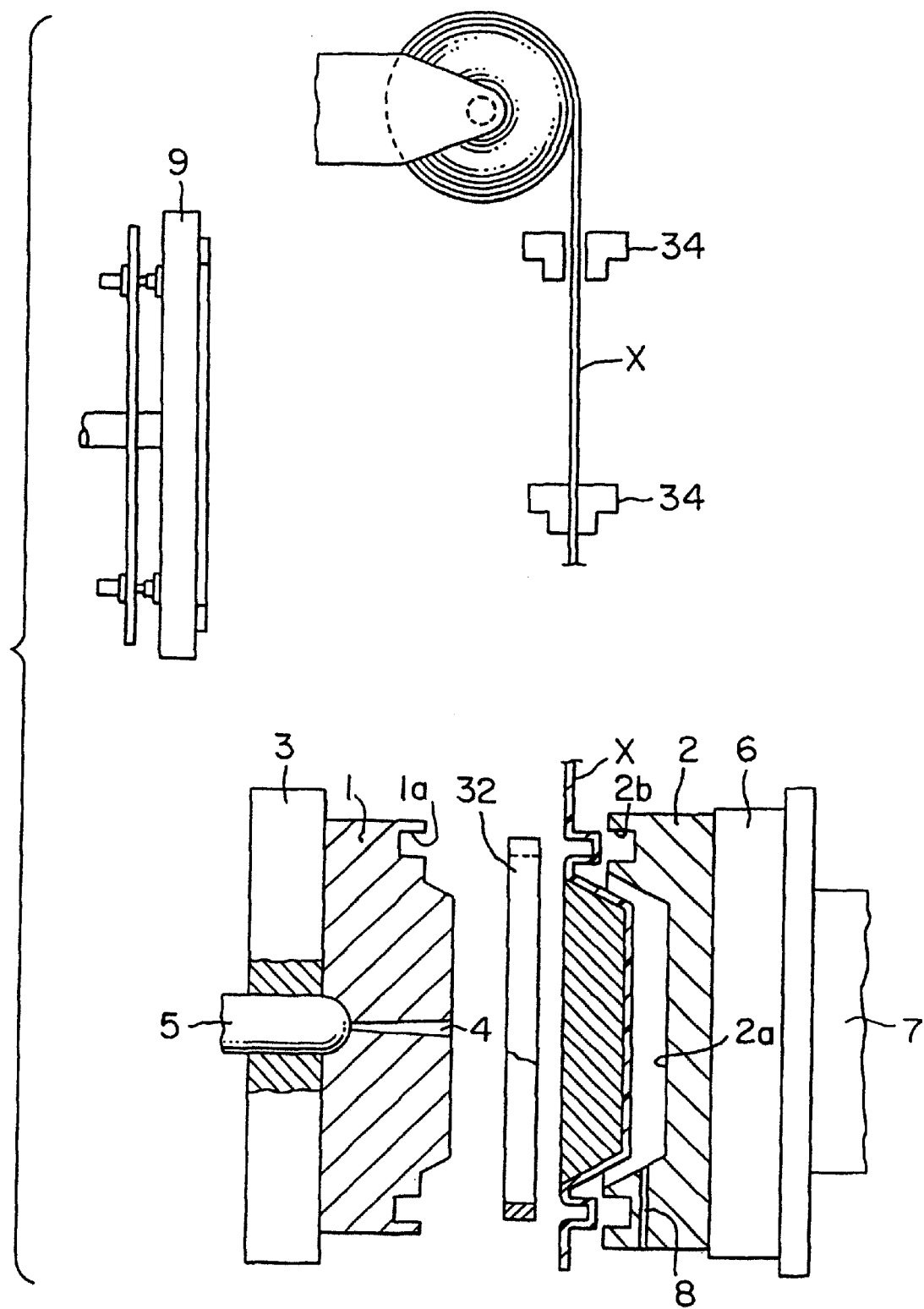
FIG. 13 is an explanation view showing a step next to the step of FIG. 12.

After the molten resin is cooled and solidified, as shown in FIG. 13, the male mold 1 and the female mold 2 are opened and then the film suppressing frame 32 is separated from the film suppressing frame fitting groove 2b on the female mold 2. Thus, a final resin molding which is adhered to the pattern-bearing film X is taken out. When the pattern-bearing film X is a transfer printing film, only the substrate film is peeled off with the pattern being left on the final molding.

Figure 14:
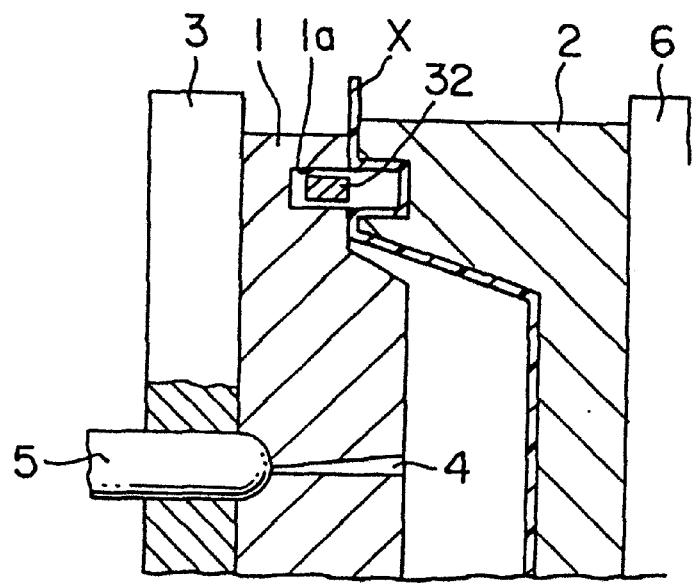
FIG. 14 is an explanation view showing a step next to the step of FIG. 13.

In another example of the method of opening the mold, after the molten resin has been cooled and solidified, as shown in FIG. 14, the film suppressing frame 32 is moved from the fitting groove 2b of the female mold 2 into the fitting groove 1a of the male mold 1. After the pattern-bearing film X is released, the mold opening operation shown in FIG. 13 may be performed. In this method, the molding may be more easily taken out from the male mold 1 and the female mold 2.

An effect intrinsic to the above-described embodiment is that since the pattern-bearing film X is fixed directly on the parting surface of the female mold and is thereafter heated and softened, deformation and displacement seldom take place on the pattern-bearing film X. In particular, when a pattern is to positionally coincide with the mold, a high positional accuracy is readily obtained. When the pattern is accurately positioned on the convex and concave of the male and female molds, a positional mark such as a cross-shaped letter is printed in advance on the pattern-bearing film X, it is detected by a positional sensor such as a photoelectric tube disposed on the apparatus, and then the feeding of the pattern-bearing film X may be stopped depending on the detected signal.

In the above-mentioned embodiment, the transfer printing method was described. However, it should be noted that the present invention may be applied to the laminate method.

In addition, in the embodiments, the panel heater which radiates near-infrared rays was used. Besides such a heater, an electric heater (which uses Nichrome coils and directly radiates Joule's heat of surface resistor or the like to the pattern-bearing film), a ceramic panel heater (which radiates far-infrared rays), or dielectric heating may be used. Moreover, as an example of heat transfer to the pattern-bearing film, radiant of infrared rays, electromagnetic wave, or the like may be directly used. Furthermore, air in the closed space may be heated so as to use heat transfer thereof to the pattern-bearing film X. Of course, both methods may be used.

Figure 16:
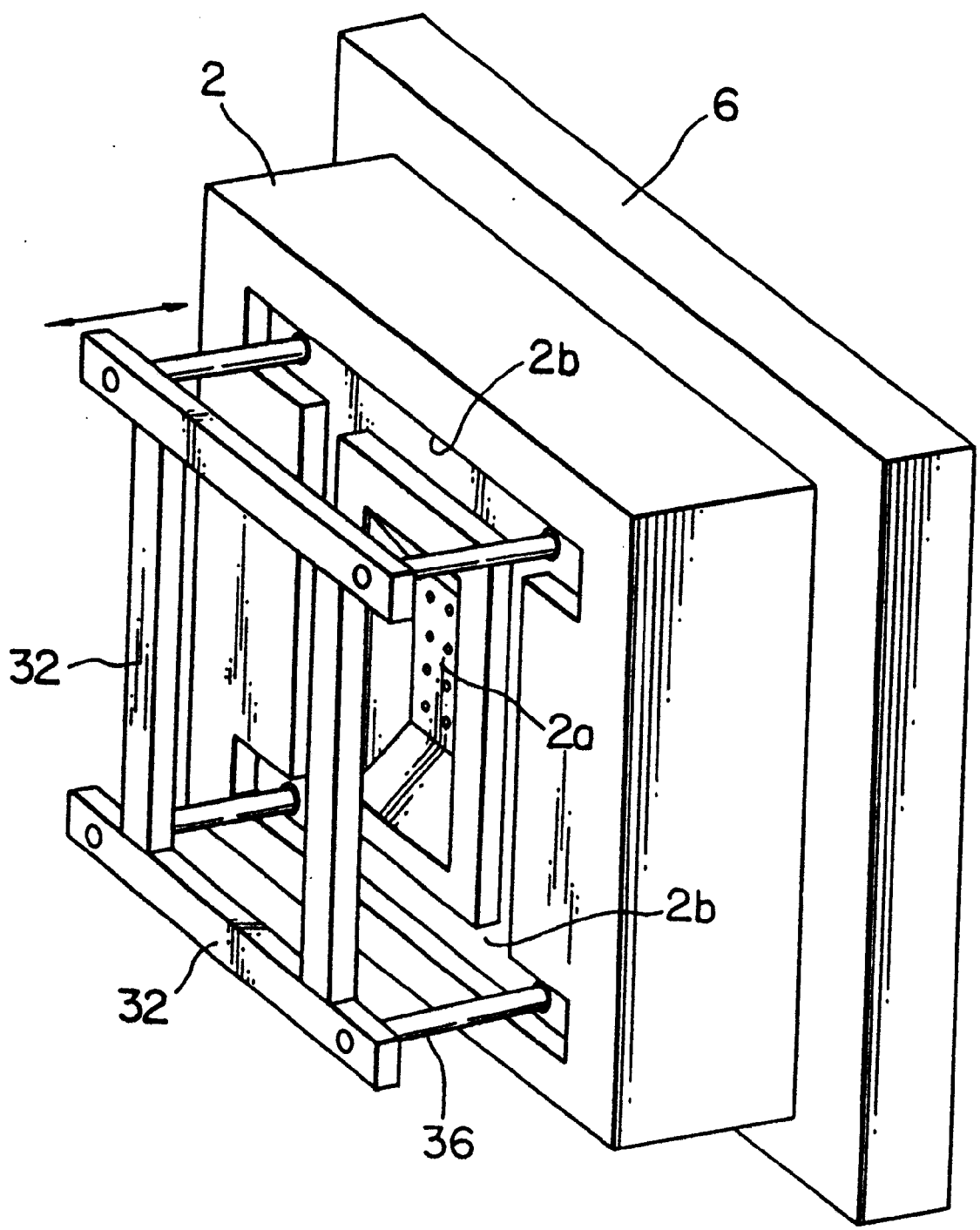
FIG. 16 is a perspective view of the female mold shown in FIG. 15.

With reference to FIGS. 15 to 19, a second embodiment of the present invention will be described, and a driving structure of the pattern-bearing film X is improved in the embodiment. As shown in FIGS. 15 and 16, to the film suppressing frame 32 are fixed two pairs of sliding rods 36, 36, 36 and 36 which are extended through the female mold 2 and the movable board 6 and are connected to a reciprocating mechanism (not shown) disposed behind the female mold 2. A film fixing frame 38 is arranged under the parting surface of the female mold 2 so as to advance thereto and retreat therefrom as shown by the arrow in FIG. 15. The film fixing frame 38 has a plate extended in parallel to the lower plate of the film suppressing frame 32, and the frame 38 at the both ends thereof is provided with a pair of operating rods 39 and 39 which have a distance therebetween being longer than the lateral distance of the pattern-bearing film X. The operating rods 39 and 39 can be moved by a reciprocating mechanism 40. On the other hand, a pair of feeding rollers 42 and 42 which can positively and reversely rotate are arranged at the downstream side of the film roll R supported on the supply and holding device S. The feeding rollers 42 positively rotate so as to feed the pattern-bearing film X toward the female mold 2, while reversely rotate to feed the film X toward the roll R.

In the embodiment, the female mold 2 is provided with a large number of small air suction holes 8a which are communicated with the cavity 2a and the air exhaust hole 8 so that the air in the cavity 2a is sucked through the small air suction holes 8a and the exhaust hole 8 to the outside. Insulation board 43 of thermal insulation material is arranged in front of the heating board 9 and can be moved by a driving device 44.

Figure 17:
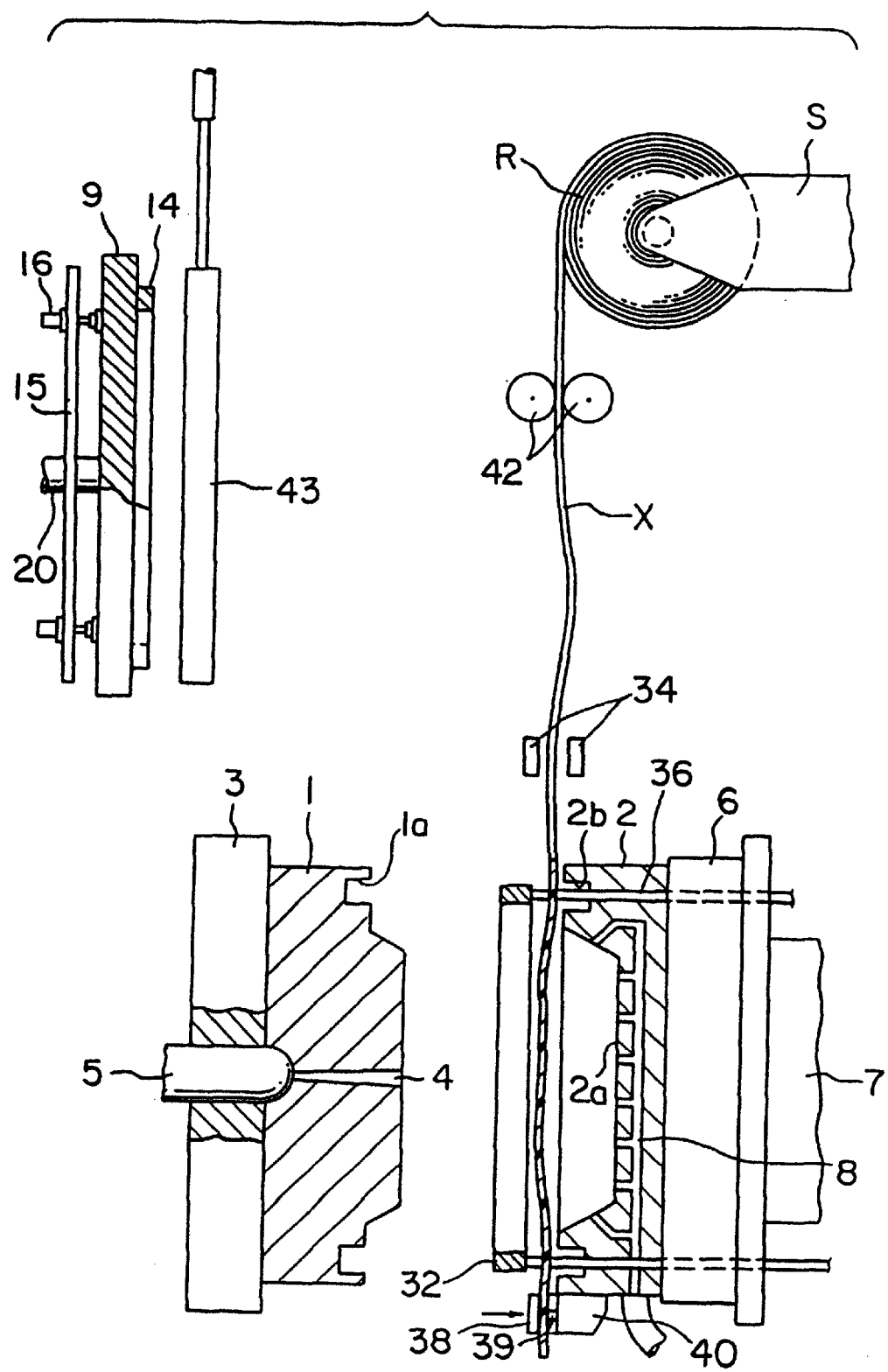
FIG. 17 is an explanation view a first step of the operation according to the second embodiment.
Figure 18:
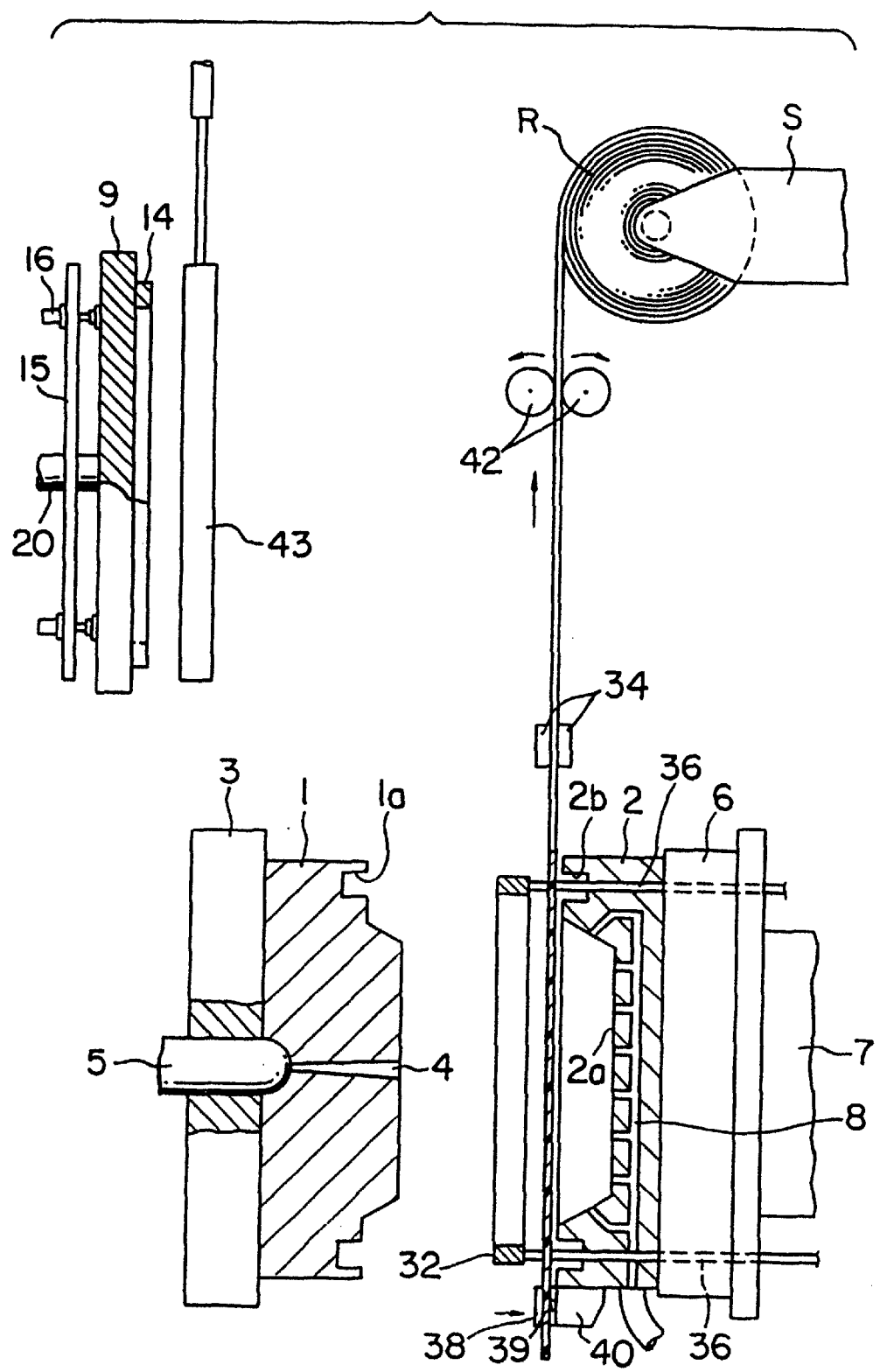
FIG. 18 is an explanation view a second step of the operation according to the second embodiment.
Figure 19:
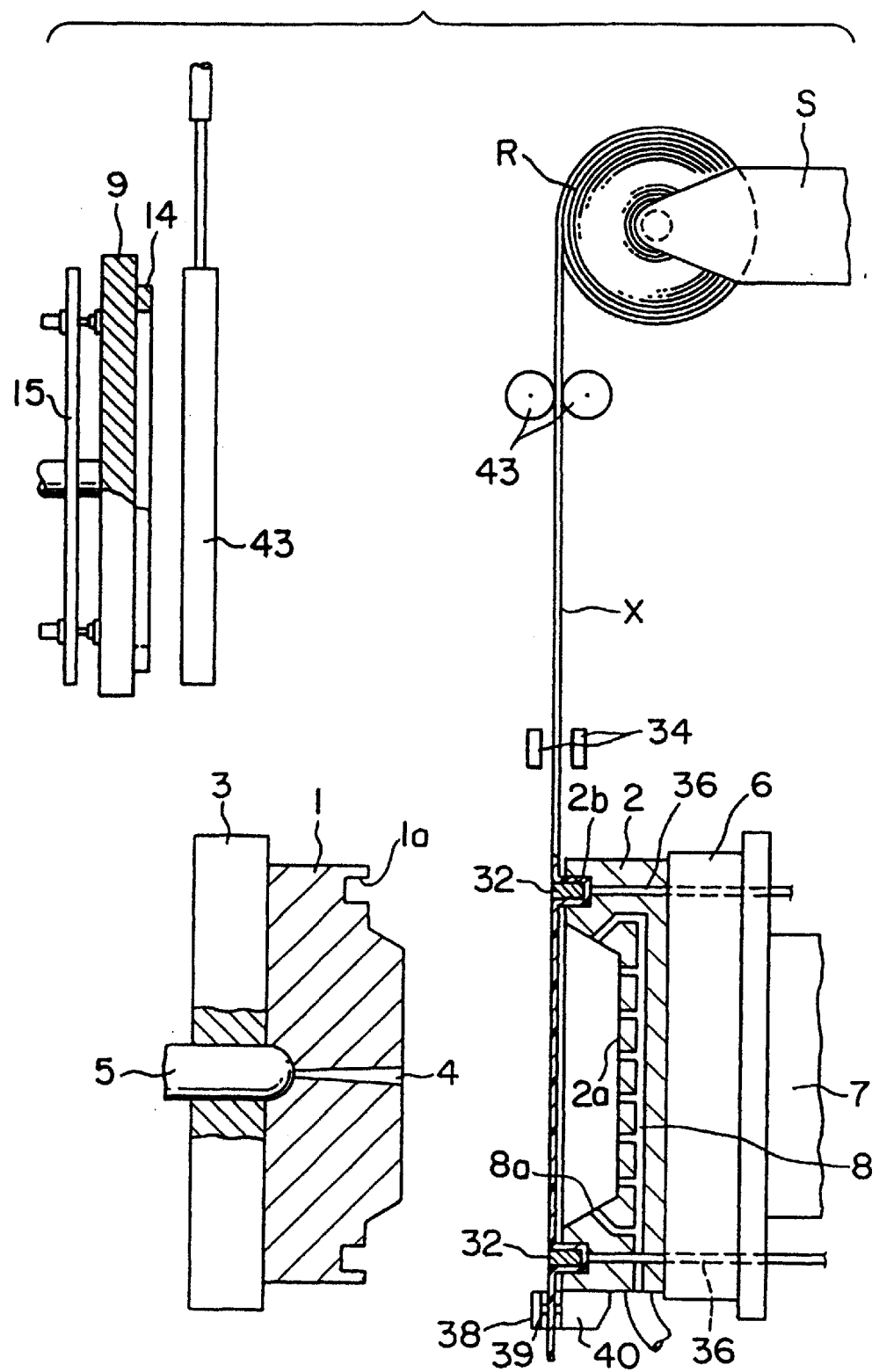
FIG. 19 is an explanation view a third step of the operation according to the second embodiment.

When the feeding roller 42 shown in FIG. 15 is positively rotated and the chuck device 34 is activated, the pattern-bearing film X is drawn until it covers the entire parting surface of the female mold 2, as shown in FIG. 17. The state shown in FIG. 17 corresponds with that shown in FIG. 7 of the first embodiment. Thus, the lower end of the pattern-bearing film X is moved to the inside of the film fixing frame 38. In this state, however, a little excess of the pattern-bearing film X is fed by the inertia thereof so that slacks or wrinkles are formed in the film X, as shown in FIG. 17. Therefore, as shown in FIG. 18, the film fixing frame 38 is retreated by the reciprocating mechanism 40 through the operating rods 39, so that the lower end of the film X is fixed by the film fixing frame 38, and at the same time the feeding roller 42 is reversely rotated. Thus, the film X is tightened so that the slacks or wrinkles can be removed. Thereafter, the sliding rods 36 are retreated, as shown in FIG. 19, so that the film suppressing frame 32 is pressed into the fitting groove 2b with the film X interposed therebetween. The state shown in FIG. 19 corresponds with that shown in FIG. 8 of the first embodiment.

Processes after the state shown in FIG. 19 corresponds with the processes shown in FIGS. 10 to 14, and a final resin molding on which a pattern is formed during the injection is removed from the molds. Also, in this embodiment, the insulation board 43 is located opposite to the heating surface of the heating board 9 waiting on the standby position shown in FIG. 15. Therefore, the insulation board 43 prevents the heat radiated from the heating board 9 from excessively heating the pattern-bearing film before forming, the forming apparatus and so forth, whereupon this restrains melting, deformation, fire and so forth of the pattern-bearing film.

Figure 20:
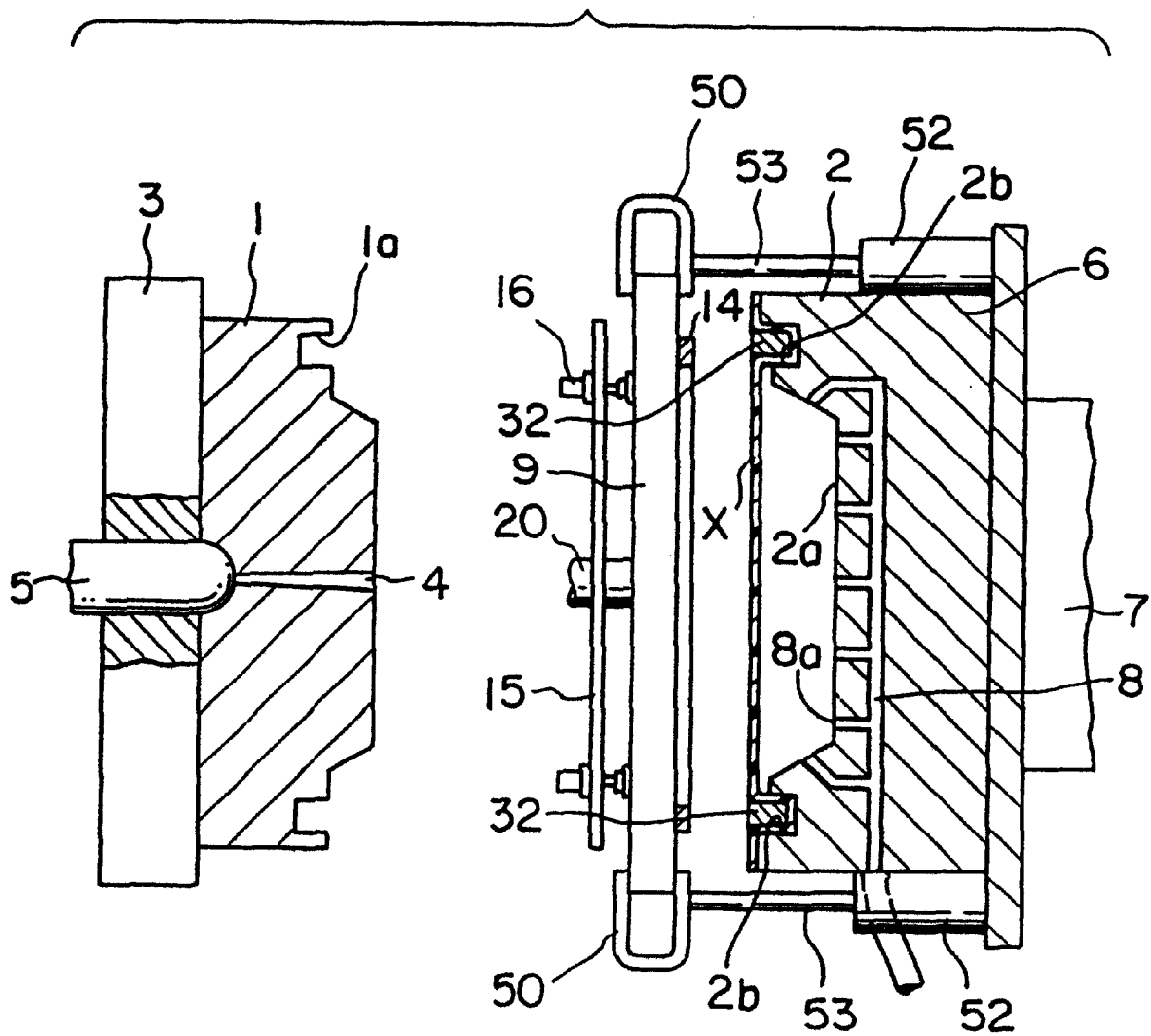
FIG. 20 is a cross-sectional view schematically showing the overall construction of an apparatus for forming a pattern onto an article during an injection molding thereof according to a third embodiment of the present invention.
Figure 22:
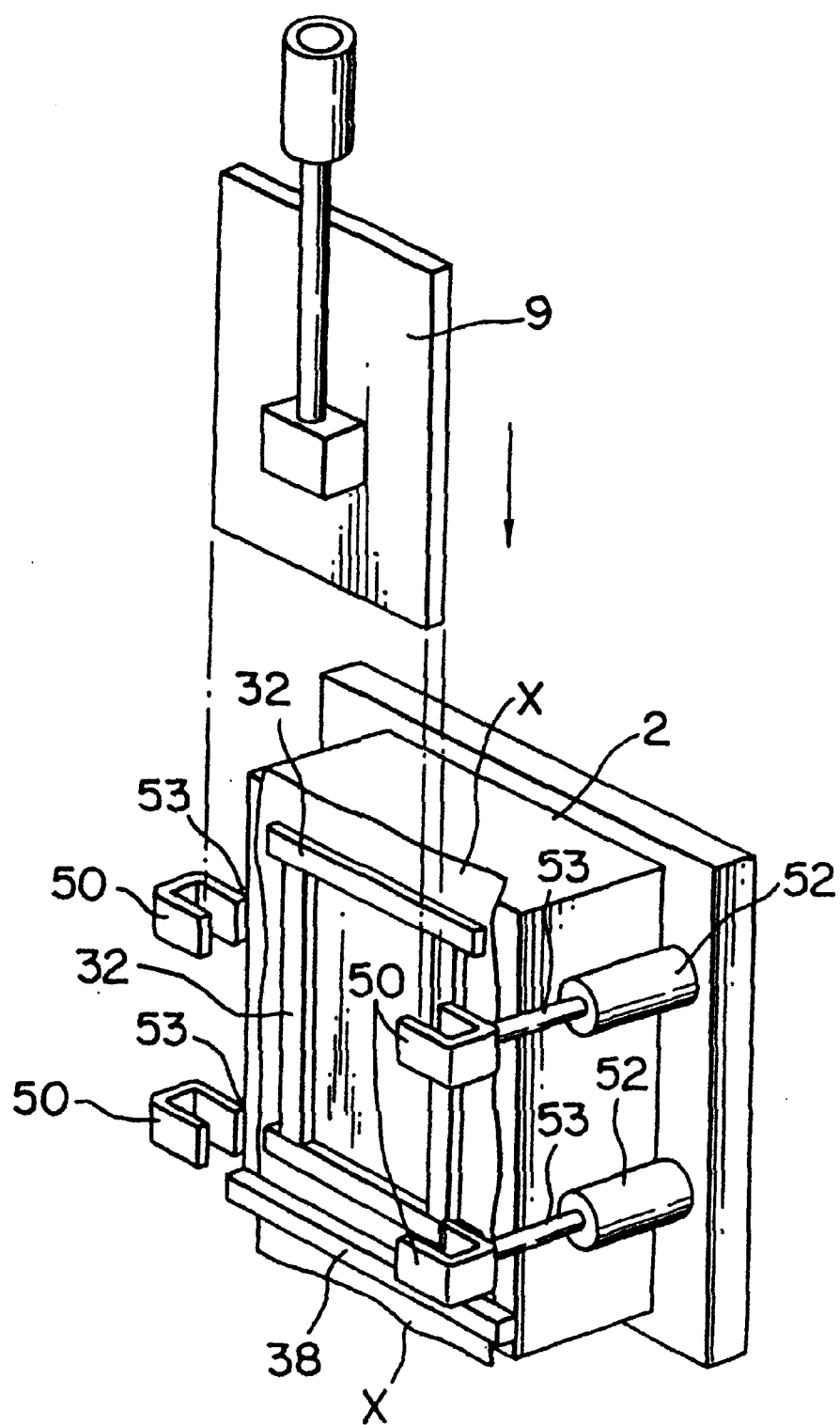
FIG. 22 is a perspective view of the female mold shown in FIG. 20.

Now, with reference to FIGS. 20 to 22, a third embodiment of the present invention will be described. FIGS. 20 and 21 are sectional views of the apparatus taken along a lateral line, respectively. As shown in FIGS. 20 to 22, two pairs of members 50 for holding heating board 9 are arranged along the both sides of the female mold 2 and the movable board 6 so as to advance thereto and retreat therefrom. Each holding member 50 is U-shaped and a pair of holding members 50 have a pair of openings opposed to each other. Each holding member 50 is reciprocated through an operating rod 53 driven by driving device 52 such as an air cylinder.

The pattern-bearing film X is fed so as to cover the entire parting surface of the female mold 2, and then, as shown in FIG. 20, the film suppressing frame 32 is pressed into the fitting groove 2b with the film X interposed therebetween, that is, the film X is fixed in the same state as shown in FIG. 8. In this state, the heating board 9 is advanced to the loading position opposed to the female mold 2, and the holding members 50 are located in a advanced position shown in FIGS. 20 and 22. Thereafter, the heating board 9 is inserted into a space between a pair of holding members 50. In order to facilitate the insertion, a pair of holding members 50 should be located apart from each other so as to hold both ends of the heating board 9, and should have an internal distance so as to slidably accommodate the heating board 9.

In the state shown in FIG. 20, holding members 50 are advanced to the left in FIG. 20 (a male direction) by the driving device 52, whereupon the heating board 9 is apart from the female mold 2. In this state, the driving device 52 causes the operating rods 53 to move to the right of FIG. 21, that is, a direction of the arrow shown in FIG. 21. Thus, the heating board 9 held by the holding members 50 are retreated to the female mold 2, and then holding frame 14 disposed in front of the heating member 9 are brought into contact with the film suppressing frame 32. When the air in the cavity 2a is sucked through the exhaust hole 8, the pattern-bearing film X which is spread around the openings of the cavity 2a is sucked to the internal surface thereof. This state is shown in FIG. 21. The processes after this state corresponds with the processes of the first and second embodiments so that the description thereof will be omitted.

According to the third embodiment, the heating board is held or surrounded by the holding members provided on the female mold so that the heating board is intensely pressed to the female mold. Even if the compressed air is blown from the heating board at the vacuum formation, the holding members prevent the heating board from being apart from or removed from the female mold. The driving device can be miniaturized, as compared that the heating board is pressed into the female mold by means of a driving device disposed extremely apart from the molds.

Figure 23:
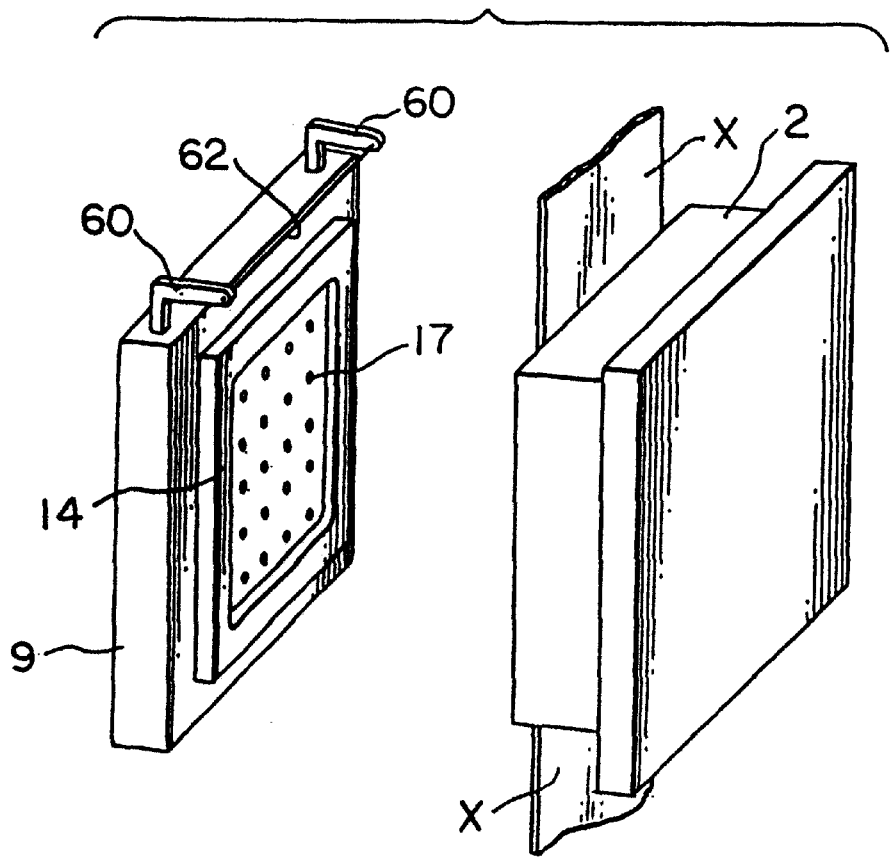
FIG. 23 is a perspective view schematically showing the construction of an apparatus for forming a pattern onto an article during an injection molding thereof according to a fourth embodiment of the present invention.
Figure 24:
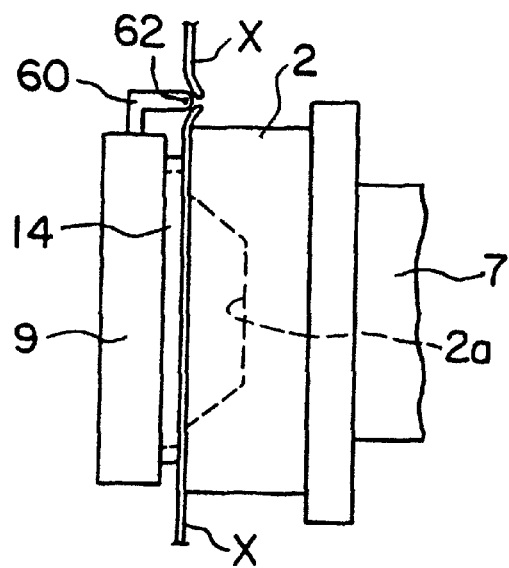
FIG. 24 is a side view of the male and female molds shown in FIG. 23.

With reference to FIGS. 23 and 24, a fourth embodiment of the present invention will be described. In the embodiment, the heating board 9 is provided at upper surface thereof with a pair of L-shaped supporting members 60 and 60. The distal ends of the L-shaped supporting members 60 and 60 are extended toward the female mold 2, and a heating wire 62 such as a Nichrome wire is stretched between the distal ends thereof. Therefore, as shown in FIG. 24, when the heating board 9 approaches the pattern-bearing film X sucked to the parting surface of the female mold 2, the heating wire 62 comes into contact with the pattern-bearing film X. Therefore, the film X is heated by the wire 62 and is cut into a proceeding portion and a following portion thereof. The cutting by the heating wire is much simpler in structure and lower in cost, as compared that the film is cut by a mechanically driven blade.

Figure 25:
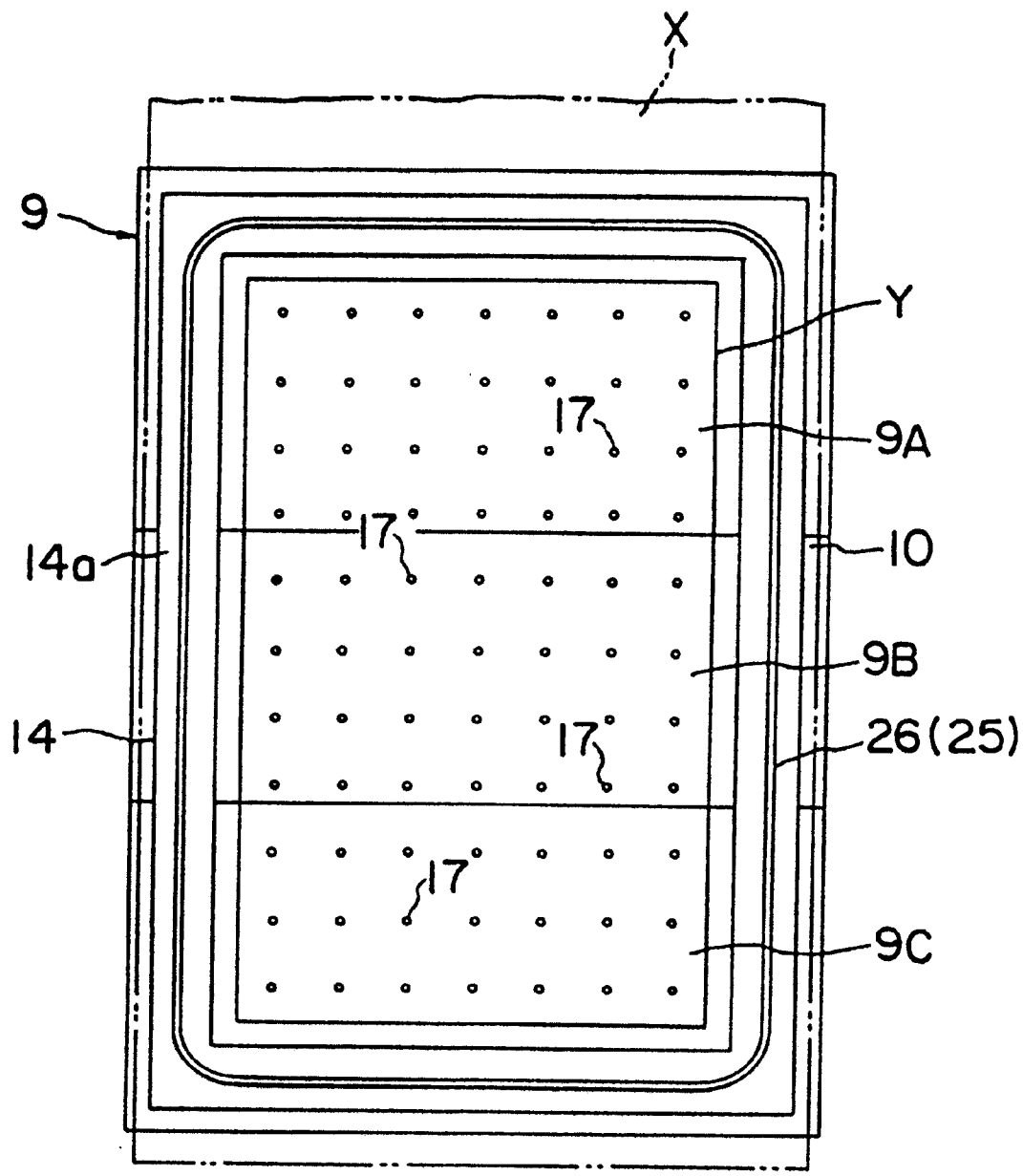
FIG. 25 is a side view of a modification of the heating board.
Figure 26:
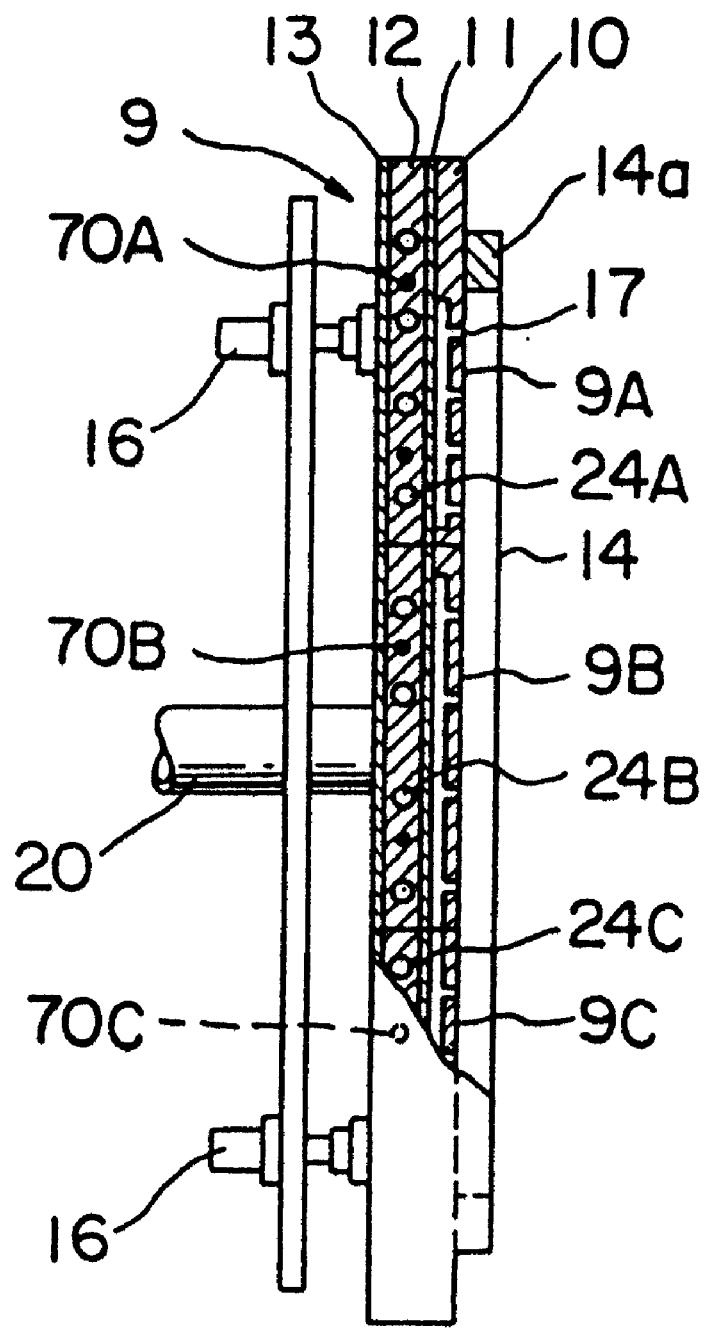
FIG. 26 is a cross-sectional view of the heating board shown in FIG. 25.

With reference to FIGS. 25 and 26, a modification of the heating board will be described. The heating board is divided into three pieces of heating blocks 9A, 9B and 9C along from the upper to the lower in turn. Although it is divided into three pieces, the number of the division may be purely optional. Electric heating wires 24A, 24B and 24C whose temperatures are individually controlled are laid within respective blocks 9A, 9B and 9C, and temperature sensors 70A, 70B and 70c are respectively inserted into three blocks 9A, 9B and 9C.

In case the heating wire is laid within the heating board so that the temperature of the heating board is uniformly distributed, the heating board constituted of one body has a tendency that the higher the position of the heating board is, the higher the temperature thereof is, whereupon the higher the position of the pattern-bearing film to be heated is, the higher the temperature thereof is. In the modification, however, as the heating board is divided into a plurality of blocks along the longitudinal direction and the temperatures of the respective blocks are individually controlled by the sensors, this prevents the temperature of the film from ununiformly distributing. The control of the temperature may be depended on the prior art thereof. The decrease and the increase of the amount of the heat generated by the wire can be performed by the prior art controller such as a thyristor, a bimetal, etc.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. An apparatus for forming a pattern onto an article during an injection molding thereof, comprising:

means for feeding a pattern-bearing film in a film feeding direction to a molding position where a male mold and a female mold are opposed, said male and female molds having parting surfaces, respectively;

a heating board for heating said pattern-bearing film so as to soften the film, said heating board having a heating surface and being movable into and away from a space between said male mold and said female mold;

means for transferring said pattern-bearing film to an internal surface of said female mold so as to cause said pattern-bearing film to contact said internal surface;

means for causing said male mold and said female mold holding said pattern-bearing film in the female mold to approach each other to form a closed molding cavity;

resin injecting means for injecting a molten resin into said cavity to form a molded article to adhere said pattern-bearing film to a surface of said article; and a heating wire supported on an upstream-side surface of said heating board with respect to said film feeding direction and at an upstream side of the female mold with respect to said film feeding direction, said heating wire being operative to heat the pattern-bearing film so as to cut the film into a proceeding portion and a following portion thereof when the heating board is moved to the pattern bearing film that has been transferred onto the parting surface of the female mold.

2. The apparatus according to claim 1, wherein said heating wire is provided in a direction that crosses said film feeding direction.

3. The apparatus according to claim 1, wherein said heating wire extends between supporting members fixed to the heating board on an upstream side thereof with respect to said film feeding direction.

4. The apparatus according to claim 1, wherein said heating board has a holding frame on one surface thereof, and said heating wire is disposed on the side of said one surface.

* * * * *